United States Patent [19]

Hikita et al.

[11] Patent Number: 4,901,237
[45] Date of Patent: Feb. 13, 1990

[54] ELECTRONIC SCALE SYSTEM

[75] Inventors: Michiyasu Hikita, Kusatsu; Hatsuo Kawaguchi, Shiga, both of Japan

[73] Assignee: Ishida Scales Mfg. Co., Ltd., Kyoto, Japan

[21] Appl. No.: 285,307

[22] Filed: Dec. 15, 1988

Related U.S. Application Data

[63] Continuation of Ser. No. 170,116, Mar. 17, 1988, abandoned, which is a continuation of Ser. No. 858,928, May 2, 1986, abandoned.

[30] Foreign Application Priority Data

May 2, 1985 [JP] Japan .................... 60-94687
May 2, 1985 [JP] Japan .................... 60-94688

[51] Int. Cl.$^4$ .................. G01G 23/22; G06F 15/20
[52] U.S. Cl. .................. 364/464.01; 177/4; 177/25.15; 364/405
[58] Field of Search ............ 177/4, 5, 25.15; 235/383; 364/405, 464.01, 464, 466

[56] References Cited

U.S. PATENT DOCUMENTS

| | | | |
|---|---|---|---|
| 3,899,775 | 8/1975 | Larsen | 364/900 |
| 3,906,208 | 9/1975 | Rogers | 177/4 |
| 4,029,161 | 6/1977 | Foster et al. | 177/25.15 |
| 4,186,439 | 1/1980 | Shimura et al. | 364/405 |
| 4,365,148 | 12/1982 | Whitney | 177/4 X |
| 4,398,253 | 8/1983 | Karp et al. | 177/4 X |
| 4,423,486 | 12/1983 | Berner | 177/25.15 X |
| 4,597,457 | 7/1986 | Ikekita | 177/25.15 |
| 4,598,780 | 7/1986 | Iwasaki et al. | 177/4 X |
| 4,601,355 | 7/1986 | Takahashi | 364/466 X |
| 4,655,304 | 4/1987 | Tajima | 177/4 |

FOREIGN PATENT DOCUMENTS

| | | |
|---|---|---|
| 0052771 | 6/1982 | European Pat. Off. |
| 0152055 | 8/1985 | European Pat. Off. |
| 2425596 | 5/1975 | Fed. Rep. of Germany |
| 3147274 | 6/1983 | Fed. Rep. of Germany |
| 55-142216 | 11/1980 | Japan |
| 58-10298 | 1/1983 | Japan |
| 59-34121 | 2/1984 | Japan |
| 2102604 | 2/1983 | United Kingdom |
| 2109966 | 6/1983 | United Kingdom |

Primary Examiner—Parshotam S. Lall
Assistant Examiner—Edward R. Cosimano
Attorney, Agent, or Firm—Staas & Halsey

[57] ABSTRACT

An electronic scale system having a plurality of electronic scales each having a device for entering and storing merchandise data with respect to many articles of merchandise. The stored merchandise data are automatically transmitted successively to the electronic scales in which the data are registered. The electronic scale system also includes a first memory for totalling and storing data such as prices obtained from the electronic scales according to codes, and a large-capacity memory for totalling and storing totals stored by the first memory for each prescribed period of time, so that the data can automatically be totalled. The electronic scale system further includes a computer for preparing merchandise data to be loaded in the electronic scales, and a transfer device for transferring the merchandise data prepared by the computer to the electronic scales either on-line or off-line.

23 Claims, 27 Drawing Sheets

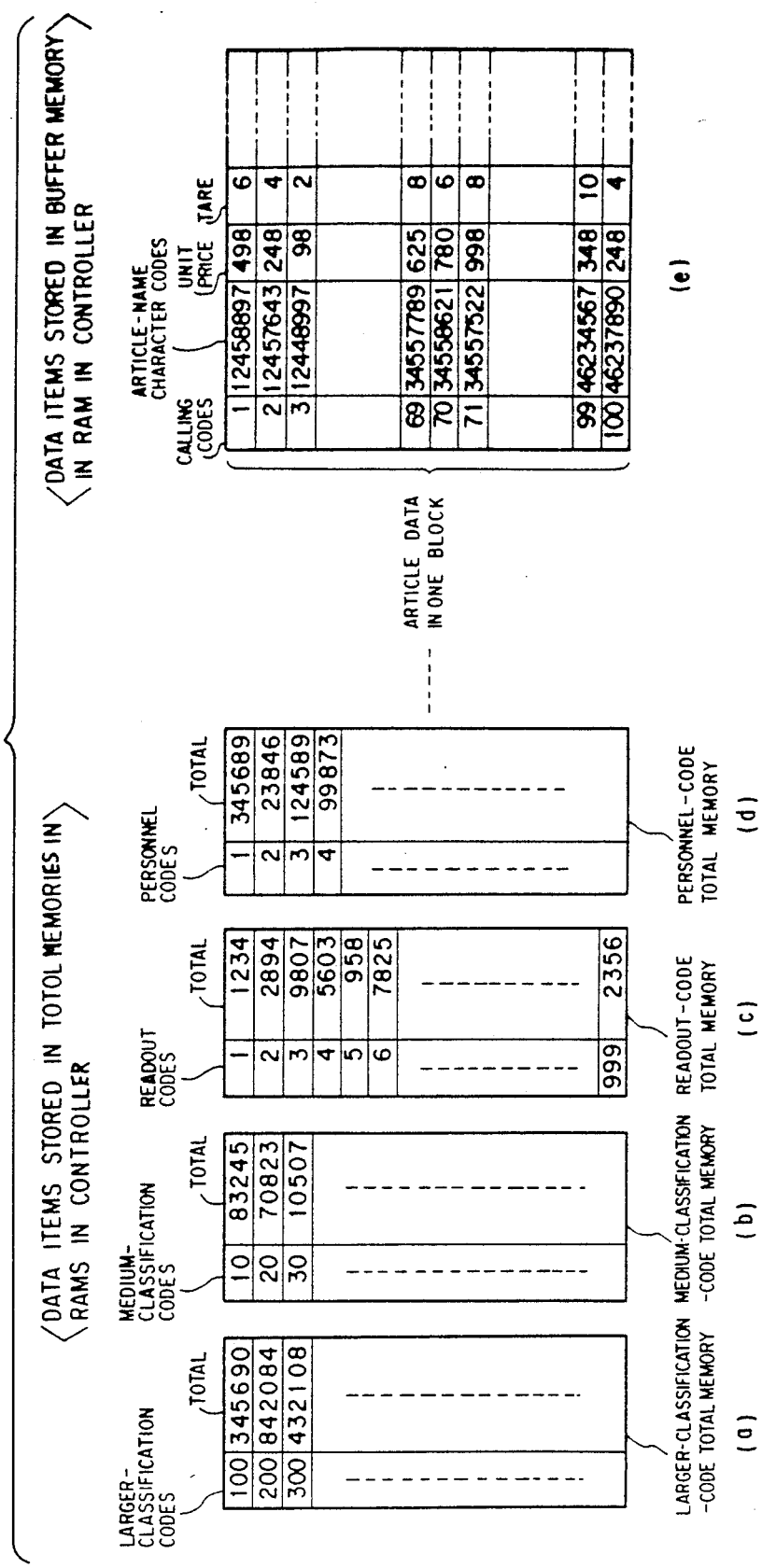

Fig. 6

⟨DATA ITEMS STORED IN REGISTER MEMORY IN RAM IN 2ND ELECTRONIC SCALE⟩

| CALLING CODES | ARTICLE-NAME CHARACTER CODES | UNIT PRICE | TARE |
|---|---|---|---|
| 71 | 34557522 | 998 | 8 |
| 72 | 34567942 | 825 | 4 |
| ----- | ----- | | |
| 99 | 46234567 | 348 | 10 |
| 100 | 46237890 | 248 | 4 |
| | | | |
| ----- | ----- | | |

UNREGISTERED AREA

Fig. 5

⟨DATA ITEMS STORED IN REGISTER MEMORY IN RAM IN 1ST ELECTRONIC SCALE⟩

| CALLING CODES | ARTICLE-NAME CHARACTER CODES | UNIT PRICE | TARE |
|---|---|---|---|
| 1 | 12458897 | 498 | 6 |
| 2 | 12457643 | 248 | 4 |
| 3 | 12448997 | 98 | 2 |
| ----- | ----- | | |
| 69 | 34557789 | 625 | 8 |
| 70 | 34558621 | 780 | 6 |

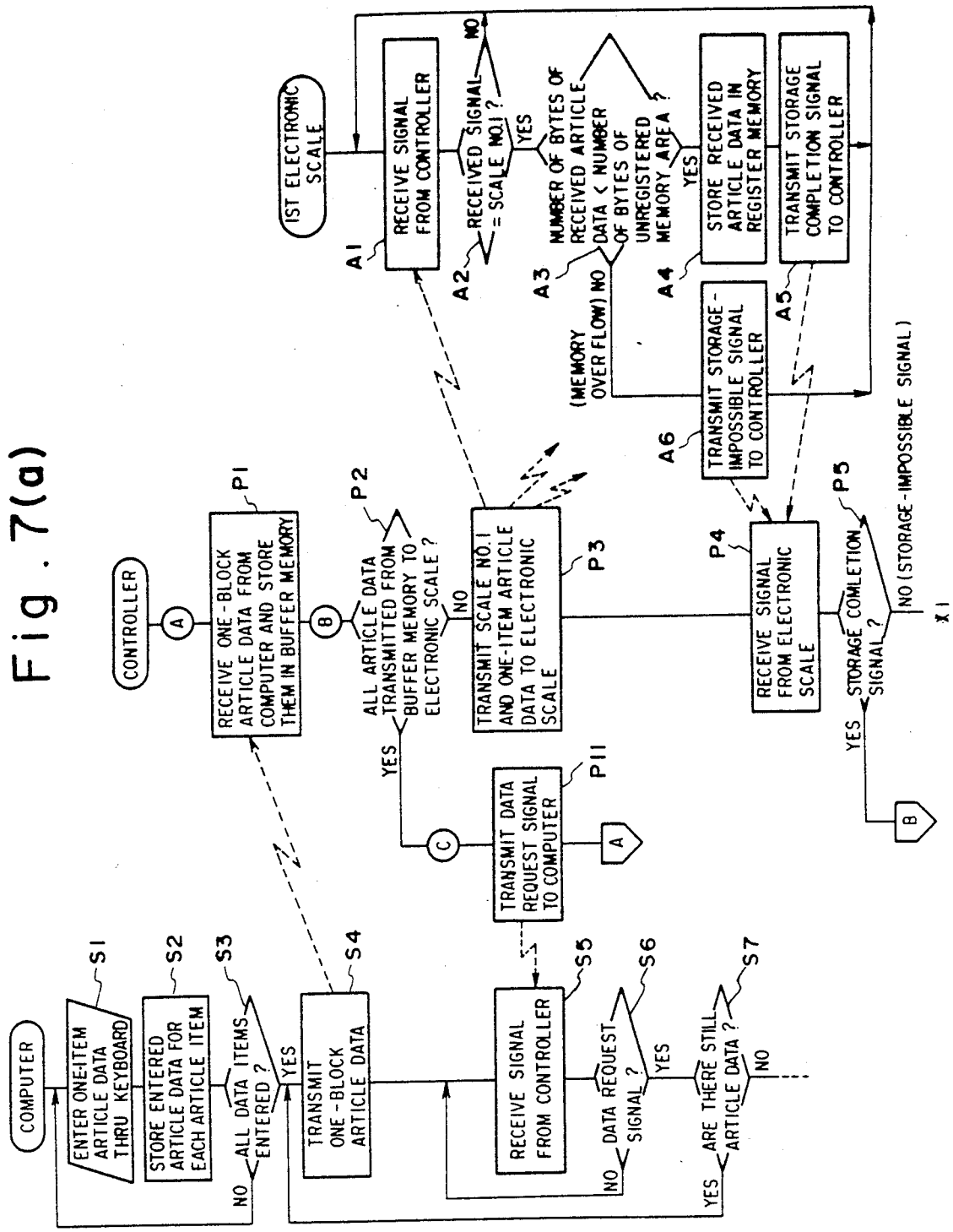

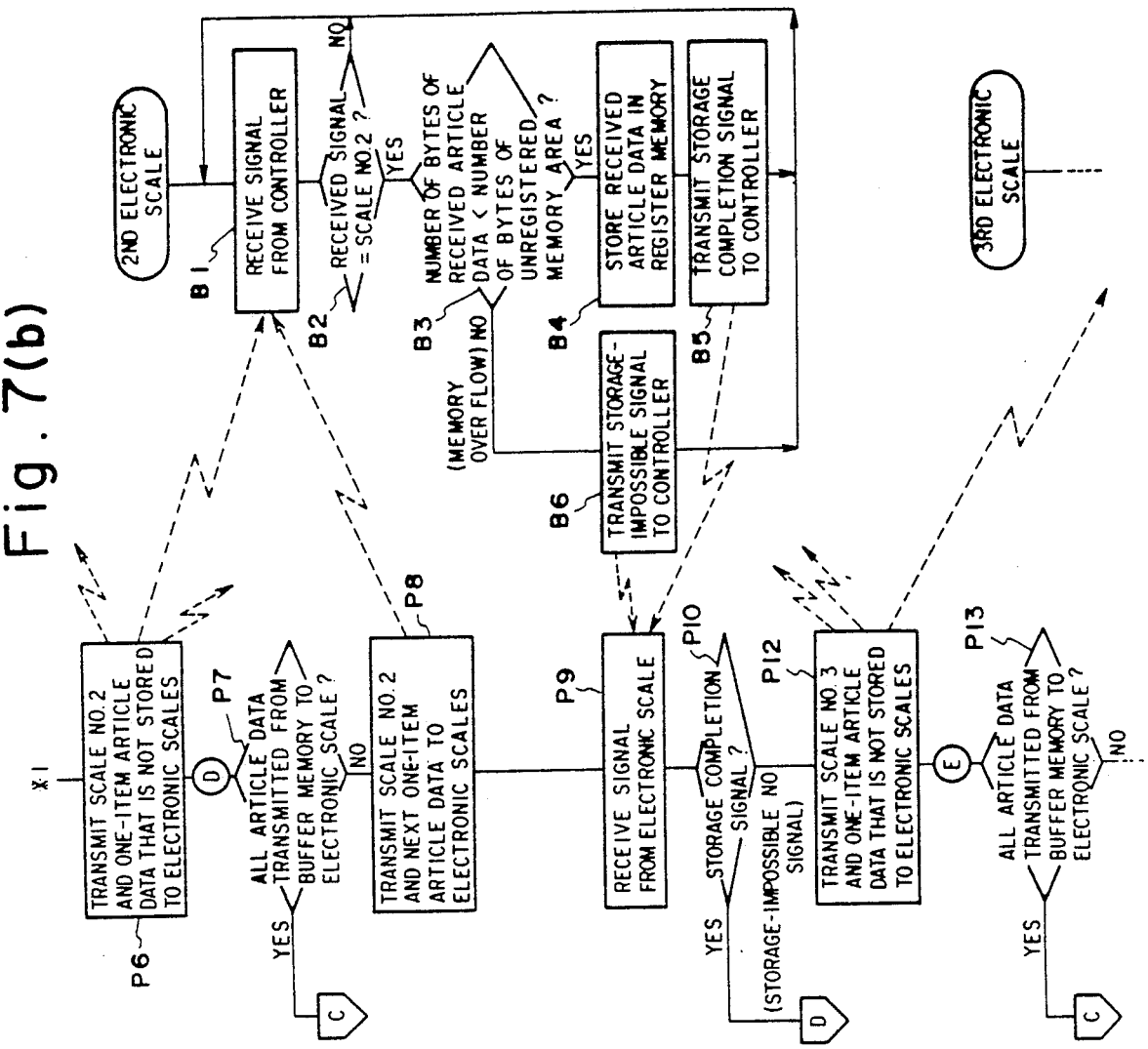

Fig. 12
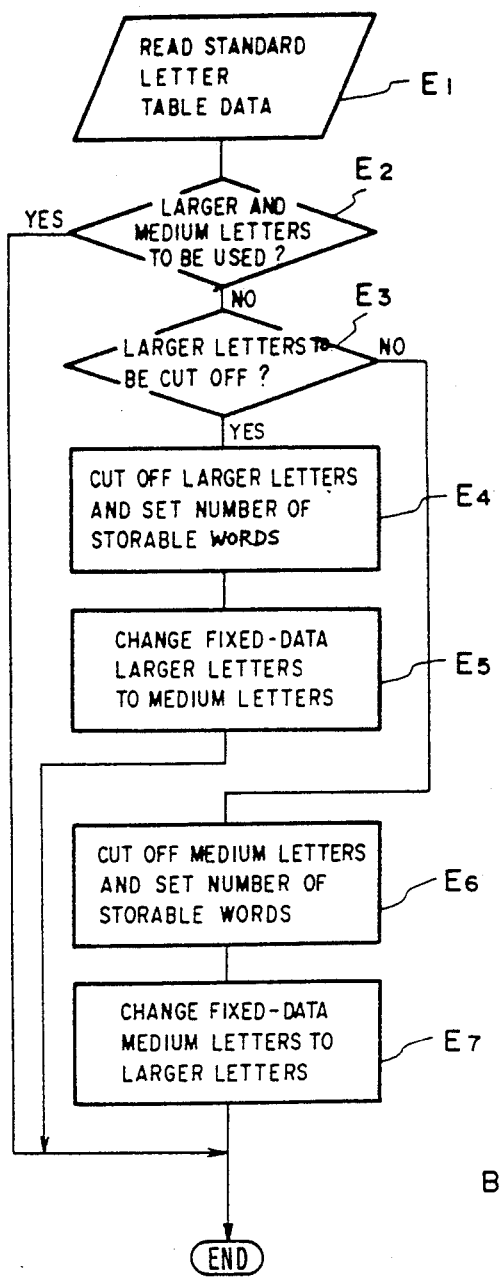
Fig. 13
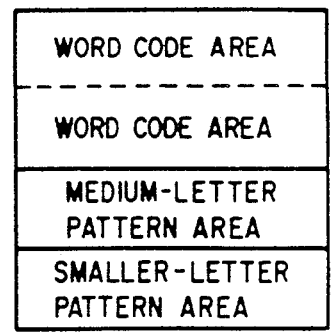
Fig. 14
BEEF → ▯2  ▯4  ▯4  ▯5

Fig. 16(a) STOCK AREA FOR ONE ARTICLE NAME

| BEEF |
| STEAK |
| BONELESS |

Fig. 16(b) ARTICLE NAME STOCK AREA

| BEEF |
| STEAK |
| BONELESS |
| BEEF |
| TIP |
| ROAST |

Fig. 16(c) RECURRENCE COUNT MEMORY

| BEEF | 23 |
| PORK | 10 |
| ROUND | 35 |
| ---- | ---- |

Fig. 16(d) RECURRENCE

| ROUND | 125 |
| BEEF | 112 |
| PORK | 89 |
| ---- | ---- |
| STEAK | 10 |
| TIP | 8 | ← CUT OFF
| ---- | ---- |

Fig. 16(e) WORD CODE TABLE

| 100 | ROUND |
| 101 | BEEF |
| 102 | PORK |
| ---- | ---- |

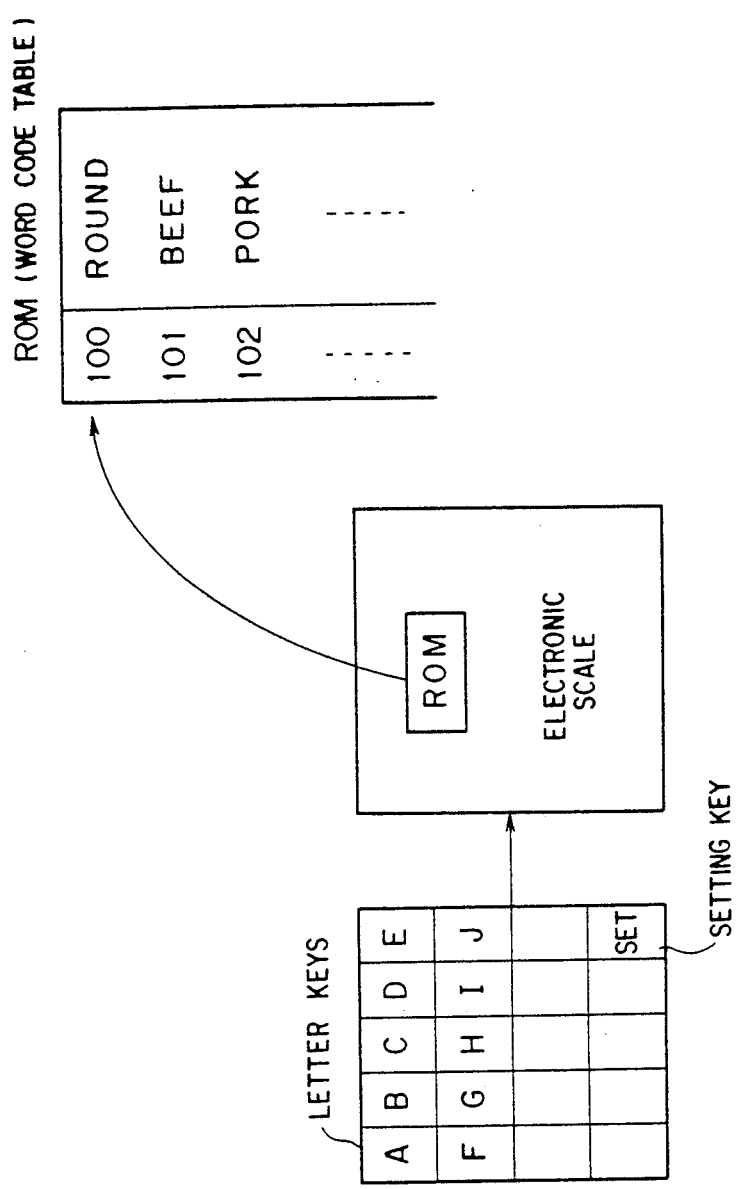

Fig. 18(a)
Fig. 18(b)
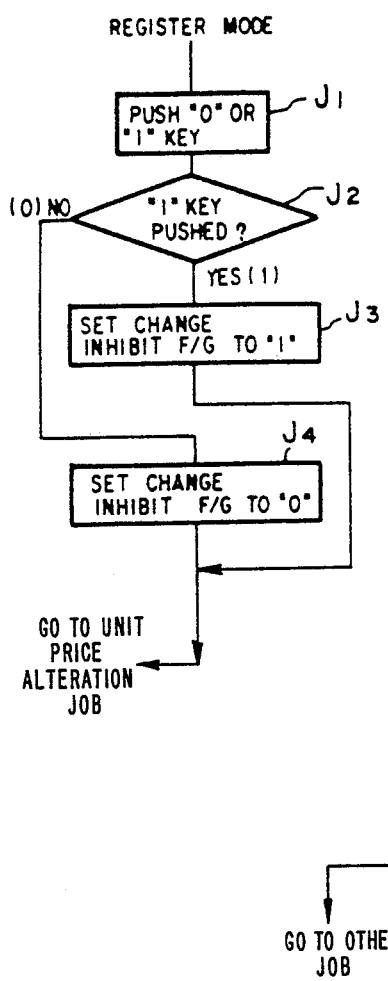
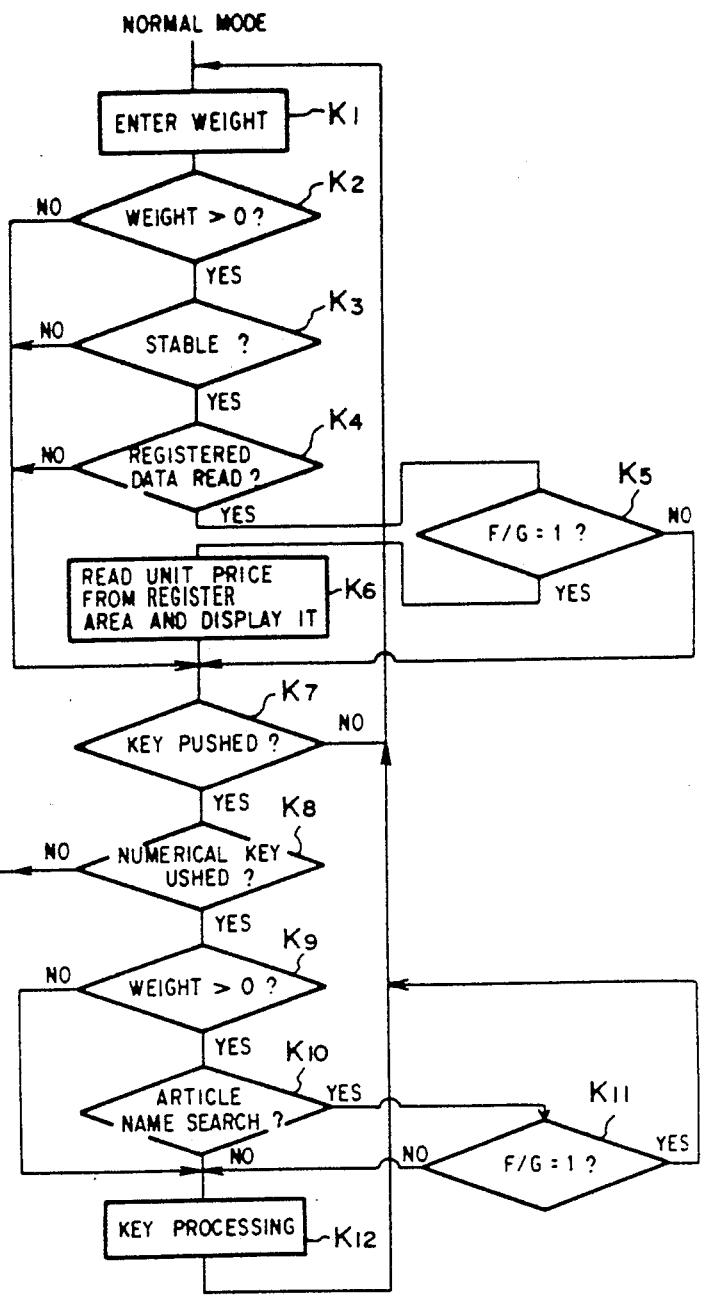

Fig. 19

REGISTER AREA
(FOR STORING REGISTERED DATA)

| CALLING NO. | ARTICLE NAME LETTER CODE | UNIT PRICE | F/G |   |
|---|---|---|---|---|
| 123 | 12567896 | 498 | 1 | --- |
| 150 | 13456820 | 78 | 0 | --- |
| 101 | 24568923 | 980 | 1 | --- |
| --- | --- | --- | --- | --- |

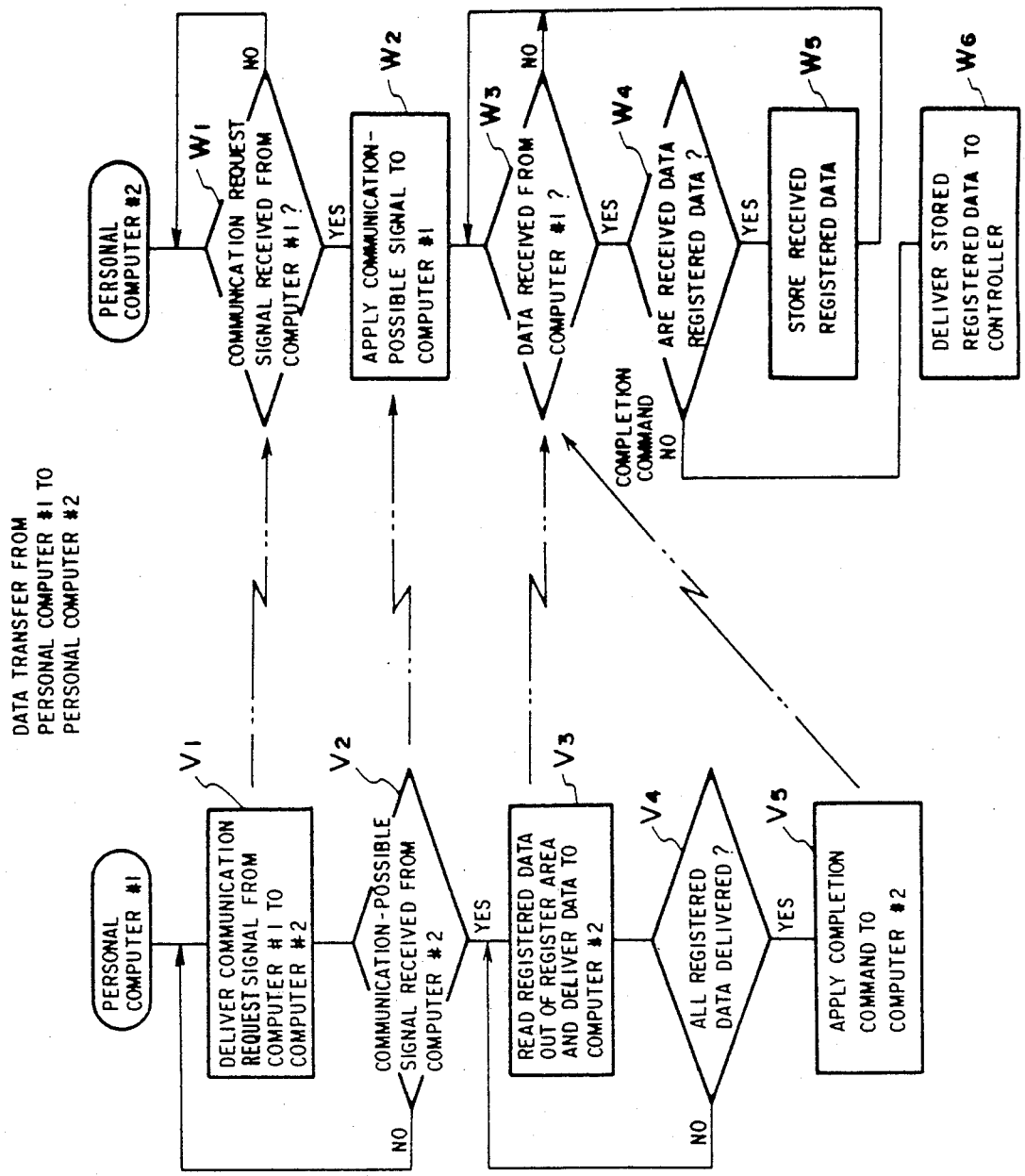
Fig. 27 DATA TRANSFER FROM PERSONAL COMPUTER #1 TO PERSONAL COMPUTER #2

ELECTRONIC SCALE SYSTEM

This is a continuation of co-pending application Ser. No. 170,116, filed on Mar. 17, 1988, now abandoned, which is a continuation of Ser. No. 858,928, filed on May 2, 1986, now abandoned.

BACKGROUND OF THE INVENTION

1. Field of the Invention

The present invention relates to an electronic scale system including a plurality of interconnected electronic scales and, more particularly, to such an electronic scale system capable of registering merchandise data in electronic scales and of totalling data items obtained by the electronic scales.

2. Description of the Related Art

Electronic scale systems are required to register data for weighed goods or articles of merchandise in the electronic scales. There has been proposed an electronic scale capable of registering or storing merchandise data such as a unit price, a tare, an effective period, and the like of weighed articles for each of available article items, as disclosed in Japanese Laid-Open Patent Publication No. 55(1980)-142216.

Japanese Laid-Open Patent Publication No. 59(1984)-34121 discloses a data calling process for delivering registered (stored) merchandise data from any of a plurality of interconnected electronic scales.

The above data calling process is advantageous in that since the memories of the respective electronic scales can be shared during use, many merchandise data items can be scattered and stored among the electronic scales, and hence the efficiency of the memories is increased. However, the procedure for registering merchandise data in these memories is complex as described below.

(1) The electronic scales are commonly positioned at different physical locations. The operator uses numeral keys on a ten-key pad and function keys of a first electronic scale to register merchandise data one by one until the memory overflows, whereupon the operator memorizes or notes the name of the last article item entered. Then, the operator goes to the second electronic scale where data for other articles items are registered until memory overflow occurs in the second scale, whereupon the registering procedure is finished for the second electronic scale. The above process is repeated until data for all article items are registered.

(2) Where some merchandise data items have already been registered in the electronic scales, the operator finds an electronic scale with a memory having an unregistered or unused area, and registers new article data in that electronic scale.

When registering article data in each of the electronic scales, the operator memorizes or notes the name of the article item when the memory overflows, and goes to the next electronic scale, thus preventing the same article item from being registered in two different electronic scales. Whether an electronic scale has an unregistered memory area, i.e., new article data can be registered, can be determined only by setting the electronic scale to a data register mode. This is because when all data items for an article item cannot be stored, i.e., the data items can be stored only partly, the electronic scale notifies the operator by producing an overflow alarm. Therefore, it is time-consuming to check to see if the memory of a certain electronic scale can register merchandise data or not.

As a consequence, the procedure for registering merchandise data in the conventional electronic scale data calling process has been tedious and time-consuming.

As disclosed in Japanese Laid-Open Patent Publication No. 58(1983)-10298, there has been developed an electronic scale system including a plurality of electronic scales to be installed in a department store or a supermarket, for example, the electronic scales being connected to a single totalling device for totalling data items delivered from the respective electronic scales.

The electronic scale system of the above type cannot total data items when they overflow the capacity of the memory of the totalling device. To avoid this shortcoming, the following routines have to be carried out:

(1) To prevent a memory overflow, the operator pushes a print key of the totalling device once a day, e.g., after the store has been closed, so that the daily total can be printed. Thereafter, the memory of the totalling device is cleared in preparation for the totalling process for the next working day.

(2) At the end of each month, the printed total data items for the respective days are manually added by the operator to prepare a one-month total list.

(3) If the operator wants to know the sales for each hour, the operator has to press the print key to print a hourly total and this clears the memory. After the store has been closed, the operator must prepare an hourly total list or graph based on the printed total data.

Since the prior electronic scale system has required the operator to do the above jobs, it has suffered the following problems:

(1) Inasmuch as the operator must periodically total data items, print the totalled data, and clear the memory on the totalling device, the operation required of the totalling device is time-consuming. If the operator forgets to perform the operation, the memory of the totalling device tends to overflow.

(2) It takes a lengthy period of time and is quite tedious for the operator to prepare a total list.

(3) The preparation of a total list is burdensome on the operator since the operator is required to press the print key at each of each period of time, e.g., one hour, and hence to be always watching the time. Another problem is that many means are required to produce various article data to be used in the electronic scale system, in each electronic scale or the totalling device.

SUMMARY OF THE INVENTION

It is an object of the present invention to provide an electronic scale system capable of easily registering various data items in a plurality of electronic scales.

Another object of the present invention is to provide an electronic scale system capable of easily registering merchandise data items in a plurality of electronic scales.

Still another object of the present invention is to provide an electronic scale system capable of automatically totalling data items such as article prices obtained from a plurality of electronic scales by totalling them according to codes such as classification codes for each given period and storing the totalled data items in a mass-storage memory such as a floppy disk, a hard disk, a magnetic tape, or other storage medium, thereby eliminating the complex totalling process that has manually been effected by the operator.

A still further object of the present invention is to provide an electronic scale system which allows the manufacturer or dealer to prepare and register merchandise data at the request of a user such as a supermarket owner and which allows electronic scales to use the merchandise data thus prepared and registered.

According to the present invention, there is provided an electronic scale system comprising: input means for entering merchandise data; memory means for storing the merchandise data entered by the input means; transmitter means for transmitting the merchandise data stored in the memory means; and a plurality of electronic scales each having a register memory for storing the merchandise data transmitted from the transmitter means and means for storing the merchandise data in an unregistered area of the register memory for each merchandise item.

According to the present invention, there is also provided an electronic scale system comprising: a plurality of electronic scales each having a register memory for storing merchandise data including unit prices and classification codes, weighing means for weighing articles of merchandise, and arithmetic means for computing the price of an article weighed based on the weight and unit price thereof; memory means for totalling and storing data items including prices obtained from the electronic scales according to codes including the classification codes; and means for reading, totalling, and storing the totalled data from the memory means for each prescribed period of time.

Further according to the present invention, there is provided an electronic scale system comprising: a plurality of electronic scales; a first computer having input means connected to the electronic scales through a transmission line for entering merchandise data, and means for transferring the merchandise data entered by the input means to the electronic scales; a second computer having means for preparing merchandise data to be entered into the first computer; and memory means for storing the merchandise data prepared by the second computer and to be entered into the first computer.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is a diagram showing total memories in a random-access memory in the controller of FIG. 2;

FIGS. 5 and 6 are diagrams of example data stored in register memories in random-access memories in first and second electronic scales;

FIG. 7 is a flowchart of an operation sequence for registering merchandise data;

FIG. 12 is a flowchart of an operation sequence for automatically adjusting a storage area;

FIG. 13 is a diagram showing the arrangement of a word code area;

FIG. 14 is a diagram showing an example of registering an article name in a memory;

FIGS. 16(a) and 16(b) are diagrams showing, by way of example, a stock area for one article item;

FIGS. 16(c) and 16(d) are diagrams showing, by way of example, a memory for storing recurrence counts for respective article items;

FIG. 16(e) is a diagram showing, by way of example, a word code table;

FIG. 17 is a diagram explanatory of the manner in which the processing of FIG. 16 is effected;

FIGS. 18(a) and 18(b) are flowcharts of operation sequences for inhibiting a unit price from being changed;

FIG. 19 is a diagram showing a register area for storing registration data;

FIG. 27 is a flowchart of an operation sequence for transferring registered data from a personal computer to another personal computer.

DESCRIPTION OF THE PREFERRED EMBODIMENTS

Figure 1:
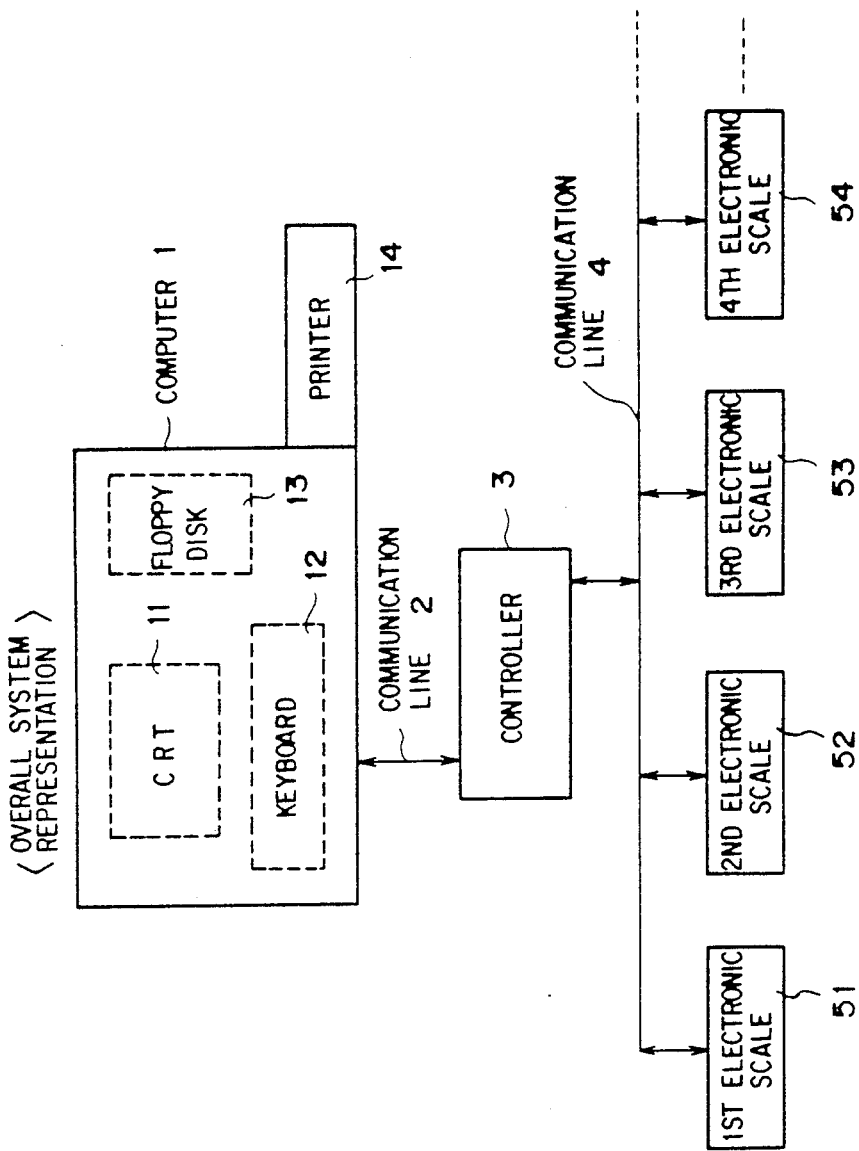
FIG. 1 is a block diagram of an electronic scale system according to the present invention.

FIG. 1 shows in block form an electronic scale system according to the present invention. The electronic scale system comprises a personal computer 1 having a CRT display 11, a keyboard 12, and a floppy disk 13 and coupled to a printer 14, a controller 3 connected to the personal computer 1 through a communication line 2, and a plurality of electronic scales 51, 52, 53, 54, . . . connected to the controller 3 through a communication line.

Figure 2:
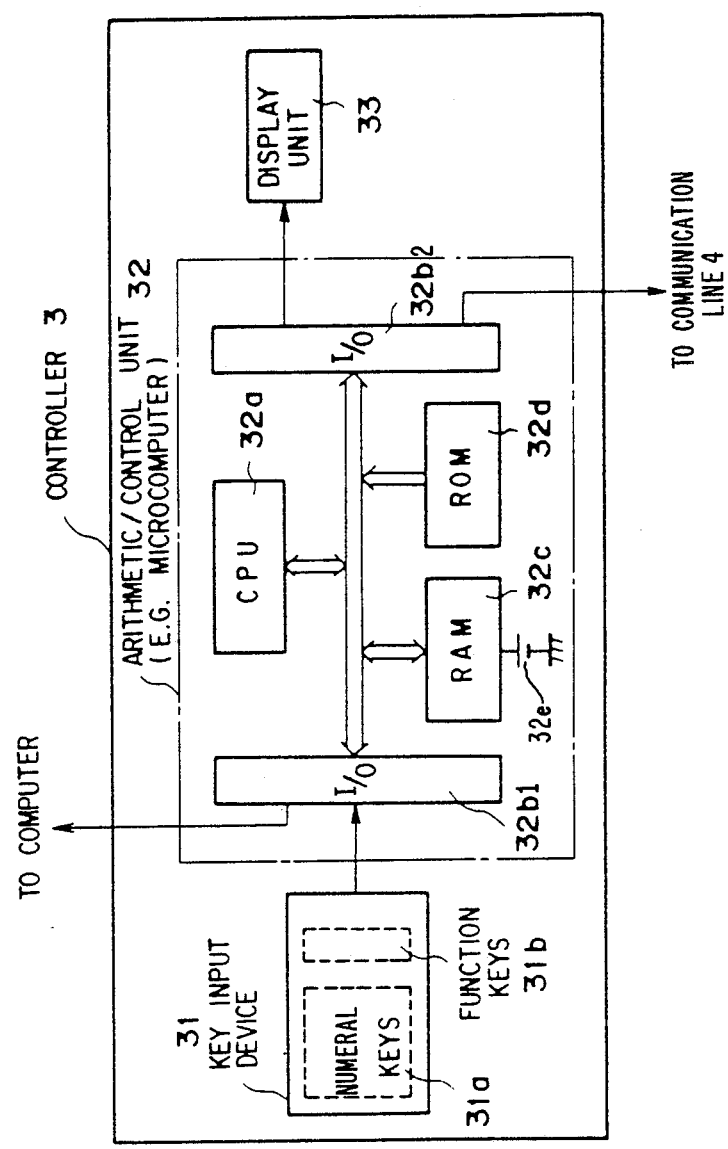
FIG. 2 is a block diagram of a controller in the electronic scale system shown in FIG. 1.

The controller 3 is schematically shown in FIG. 2. The controller 3 comprises a key input device 31 having numeral keys 31a and function keys 31b, an arithmetic/control unit 32 comprising a microcomputer, for example, having a central processing unit (CPU) 32a, input/output (I/O) ports, 32b1 and 32b2, random-access memory (RAM) 32c backed up by a DC power supply 32e, and a read-only memory (ROM) 32d, and a display unit 33.

Figure 3:
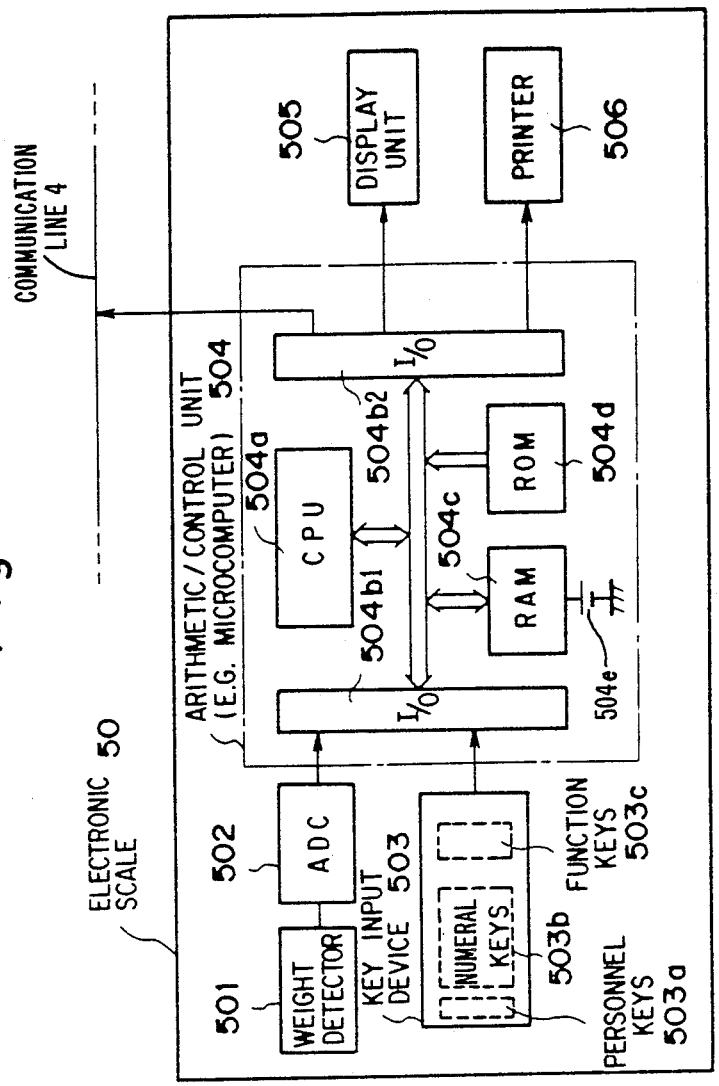
FIG. 3 is a block diagram of each electronic scale in the electronic scale system of FIG. 1.

Each of the electronic scales is illustrated in FIG. 3. Each electronic scale 50 includes a weight detector 501 comprising a load cell or the like, an A/D converter 502 for converting an analog signal from the weight detector 501 to a digital signal, a key input device 503 including personnel keys 503a, numeral keys 503b, and function keys 503c, an arithmetic/control unit 504 comprising a microcomputer, for example, having a central processing unit (CPU) 504a, input/output (I/O) ports 504b1 and 504b2, a random-access memory (RAM) 504c backed up by a DC power supply 504e, and a read-only memory (ROM) 504d, a display unit 505 for displaying the weights, prices and the like of articles of merchandise weighed, and a printer 506 for printing certain data items on labels or sheets.

FIG. 4 shows, by way of example, data items stored in total memories in the RAM 32c in the controller 3. As illustrated, the RAM 32c includes a larger-classification-code total memory (shown at (a)) for storing total data for meats, fishes, vegetables, and the like, and a medium-classification-code total memory (shown at (b)) for storing total data for beef, pork, chicken. The RAM 32c also includes a calling-code total memory (shown at (c)) for specifying calling codes for respective articles of merchandise such as sukiyaki beef, yakiniku beef, and the like, personnel-code total memory (shown at (d)) for storing total data according to personnel codes, and a buffer memory (shown at (e)) for storing article or merchandise data items such as article-name letter codes, prices, tares. This data is stored for the respective articles from calling codes 1 to 100 in one block. The contents of the memory RAM 32c shown in FIG. 4 will now be described. Though not illustrated in FIG. 4, the stored contents shown in (a) through (e) of FIG. 4 are stored at addresses of the RAM 32c item by item, that is, corresponding to calling codes. For example, the data shown in FIG. 4(a) are stored in the RAM 32c at addresses from "00000" to "00100". By way of example, in, say, electronic scale 51 handled by an operator with personnel code 1, assume that T-bone steak meat purchased by a customer is weighed and that the purchase price is calculated. Also, assume that the calling code for T-bone steak meat is "1". The RAM 32c is retrieved from the electronic scale 51, the contents stored at calling code 1 are read from the stored contents shown in FIG. 4e, and the read contents are transferred to the RAM of the electronic scale 51. The tare is substracted from the measured value of the T-bone steak meat measured within the electronic scale 51, and this value is multiplied by the unit price to calculate the selling price. Also, "T-BONE STEAK MEAT" is printed on a label from the article-name character code, along with the unit price, total price and other necessary information. At the same time, the selling prices are added cumulatively in the item "PERSONNEL CODE 1" shown in FIG. 4(d), and in the items "READ OUT CODE 1" of "T-BONE STEAK MEAT", "MEDIUM-CLASSIFICATION CODE 10" (the medium classification of meat is 10) and "LARGER-CLASSIFICATION CODE 100 (the larger-classification code of meat is 100). The RAM 32 will be described later.

FIGS. 5 and 6 show, by way of example, data items stored in register memories in the RAMs 504c in the first and second electronic scales. In the illustrated example, the data items of the articles of merchandise ranging from the calling codes 1 to 70 are stored in the first electronic scale, whereas the data items of the articles ranging from the calling codes 71 to 100 are stored in the second electronic scale, with unregistered areas remaining in the register memory in the second electronic scale.

Operation of the electronic scale system thus constructed will be described below.

FIG. 7 is a flowchart of an operation sequence for registering merchandise or article data. A process of registering article data will be described with reference to the flowchart of FIG. 7.

(1) When the operator enters article data items through the keyboard 12 of the computer 1 in a step S1, the computer 1 stores the article data items into an article data memory in the floppy disk 13 in a step S2 for article items, and then checks to see if all of the article data items have been entered in a step S3. When the entry of the article data has not been completed, the program returns to the step S1 and the operation for entering the article data is repeated.

(2) If all of the article data items have been entered, i.e., the answer to the decision step S3 is yes, then the computer 1 transmits the article data items for one block, e.g., the article data items for 100 article items, to the controller 3 in a step S4, and checks to see if it has received a data request signal from the controller 3 in steps S5, S6. Since no data request signal has been transmitted from the controller 3 at this time, the computer 1 waits in the loop of the steps S5 and S6. If the data request signal is received from the controller 3 (step S6), it is determined whether there is article data to be sent from the computer 1 to the controller 3 (step S7). When the answer is YES, the program returns to the step S4 and the next single block of article data is sent to the controller. When the answer is NO, a signal indicating that there is no article data is sent to the controller (step S8) and the job is ended.

(3) The controller 3 receives the article data items from the computer 1 and stores them in the buffer memory in the RAM 32c in a step P1, as shown in FIG. 4(e). In a step P2, no article data items are transmitted from the controller 3, and hence the designation of the scale number 1 and the article data items (those for the calling code 1 since this is the first processing cycle) for one article item from the buffer memory in the RAM 32c are transmitted to the respective electronic scales in a step P3. After the article data has been sent from the controller 3 to each of the electronic scales, transmission of the next single block of article data is requested of the computer 1 at step P11, and the program returns to step P1 through steps P12 and P13, in order that the next items of article data may be transmitted to the electronic scales. The details of this operation will be described later.

The first electronic scale receives the transmitted data (step A1) and ascertains whether it is in agreement with its own scale number at step A2.

For the first electronic scale, if the answer to the decision step A2 is yes, and then the first electronic scale compares the number of bytes of the received article data items with the number of bytes of an unregistered area in the register memory to check whether the received article data items can be stored in the unregistered memory area in a step A3. If the received data items can be stored in the unregistered memory area, then they are stored in the register memory in a step A4, and the first electronic scale transmits a storage completion signal to the controller 3 in a step A5. When the transmitted article data is found not to be its own at the step A2, the program returns to the step A1 and a wait for transmission of article data from the controller 3 occurs.

(4) In response to the storage completion signal from the first electronic scale in step P4, the controller 3 confirms that it is the storage completion signal in a step P5. If the answer received at step P5 is yes, then, the program goes back to the step P2, and the electronic scale system repeats the loop from the steps P3 to A1 to A5 to P4 to P5 so that the article data items from the controller 3 will successively be registered or stored in the first electronic scale (see FIG. 5).

(5) In the illustrated example, the first electronic scale experiences memory overflow at the article item identified by the calling code 71 in the step A3, and a storage-impossible signal is transmitted to the controller 3 in a step A6.

(6) The controller 3 is responsive to the storage-impossible signal "no" from the first electronic scale (steps P4 and P5) for transmitting the designation of the scale number 2 and the article data items that have not been stored (the article data items of the calling code 71 which have not been stored in the first electronic scale) to the respective electronic scale in a step P6. Since article data from Case No. 72 onward remains in the RAM 32c of the controller 3 upon the return from step P6 to step P2, the program naturally proceeds in the "NO" direction, the electronic scale No. 2 is designated in step P3 and the remaining article data are sent to the electronic scale No. 2.

(7) The electronic scale receives the signal from the controller 3 in step A1, and check to see if the received signal agrees with its own scale numbers in steps A2. Only the answer to the decision step A2 for the second electronic scale is yes at this time, and the second electronic scale executes the loop from steps A3, A4, A5, whereas the controller 3 executes the loop consisting of steps P4, P5, P2 and the second electronic scale stores the article data item of the calling code 72. When the transmitted article data is not its own at step A2, the program returns to the step A1 and awaits transmission of article data from the controller 3.

(8) The second electronic scale and the controller 3 repeatedly execute the steps P2, P3, A1–A5, P4, P5 to register article data items from the controller 3 into the second electronic scale (see FIG. 6).

(9) If all of the article data items (for 100 article items in the illustrated example) stored in the buffer memory in the RAM 32c of the controller 3 have been transmitted, the answer to the step P2 becomes yes, and the controller 3 transmits a data request signal to the computer 1 in a step P11 in order to request article data items for a next block.

(10) The computer 1 receives the signal from the controller 3 in the step S5 and confirms that the signal is the data request signal in the step S6. If there are still article data items available in a step S7, the computer 1 transmits article data items for the next block (for example, article data items for calling codes 101 to 200) to the controller 3 in the step S4.

(11) The controller 3 receives the next article data items and stores them in the buffer memory in the RAM 32c in the step P1, and executes the steps P2, P3 to transmit the designation of the scale number 2 and the article data items for one article item to the electronic scales. The second electronic scale receives the signal from the controller 3 at step A1 and checks to see if the received signal agrees with its own scale number at step A2. Only the answer to the decision step A2 for the second electronic scale is YES at this time, and the second electronic scale executes the loop consisting of steps A3, A4, A5, whereas the controller 3 executes the loop consisting of steps P4, P5, P2 and the second electronic scale stores the article data item of the calling code 101.

The second electronic scale receives the signal at the step A1, executes the steps A2, A3, A6, and transmits a storage-impossible signal to the controller 3.

The controller 3 receives the storage-impossible signal in the step P4, executes the steps P5, P6, and transmits the designation of the scale number 3 and one item of the article data to the third electronic scale.

Then, the third electronic scale receives the signal from the controller 3 in the step A1, and executes the steps A2–A4 to store the article data. Upon completion of the data storage, the third electronic scale transmits a storage completion signal to the controller 3 at the step A4.

In response to the signal from the third electronic scale at the step P4, the controller 3 confirms that the received signal is the storage completion signal in the step P5, and returns to the step P2. If all of the article data stored in the RAM 32c has been transmitted at the step P2 ("YES"), then an article data transmission is requested of the computer 1 at step P11. When transmission of all of the article data to be sent from the computer 1 to the controller 3 is completed, the controller 3 is informed of this fact at a step S8.

The controller 3 receives this signal at a step P12, learns of the end of transmitting data from the computer at step P13 ("YES") and informs the electronic scales of the end of transmission at a step P14. The electronic scales receive the reception end signal at a step A7 and learn of the end of reception at step A8, whereby the series of jobs ends.

It should be noted that if the reception end signal from the controller is not received at the end of the storage operation of one item (at the end of step A5) at the step A7, this step is skipped and the program proceeds to step A8. In this case, step A8 is also passed and the program proceeds to step A1.

Figure 8A:
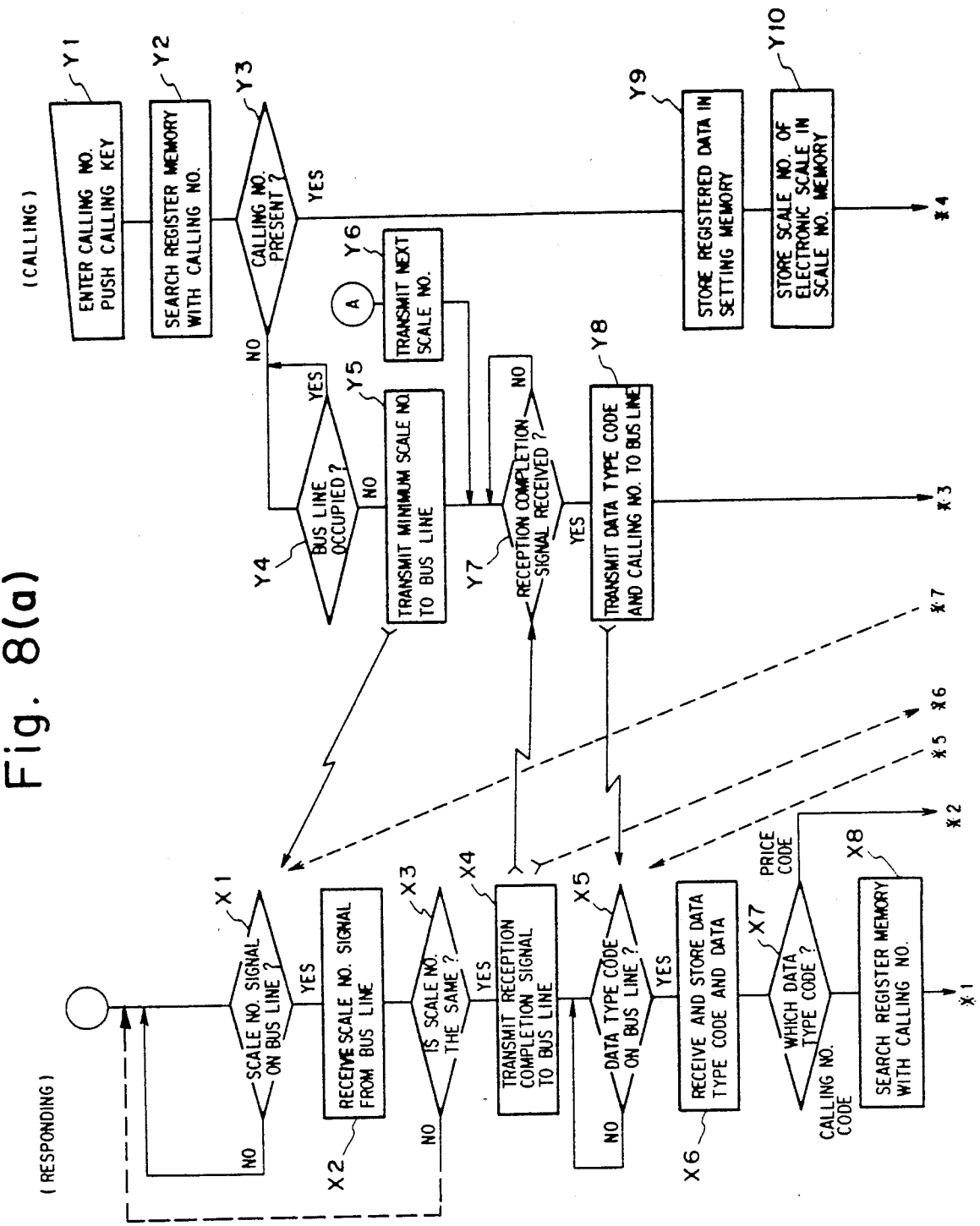
FIG. 8, including 8(a) and 8(b), is a flowchart of an operation sequence for mutually calling and responding to merchandise data between electronic scales.
Figure 8B:
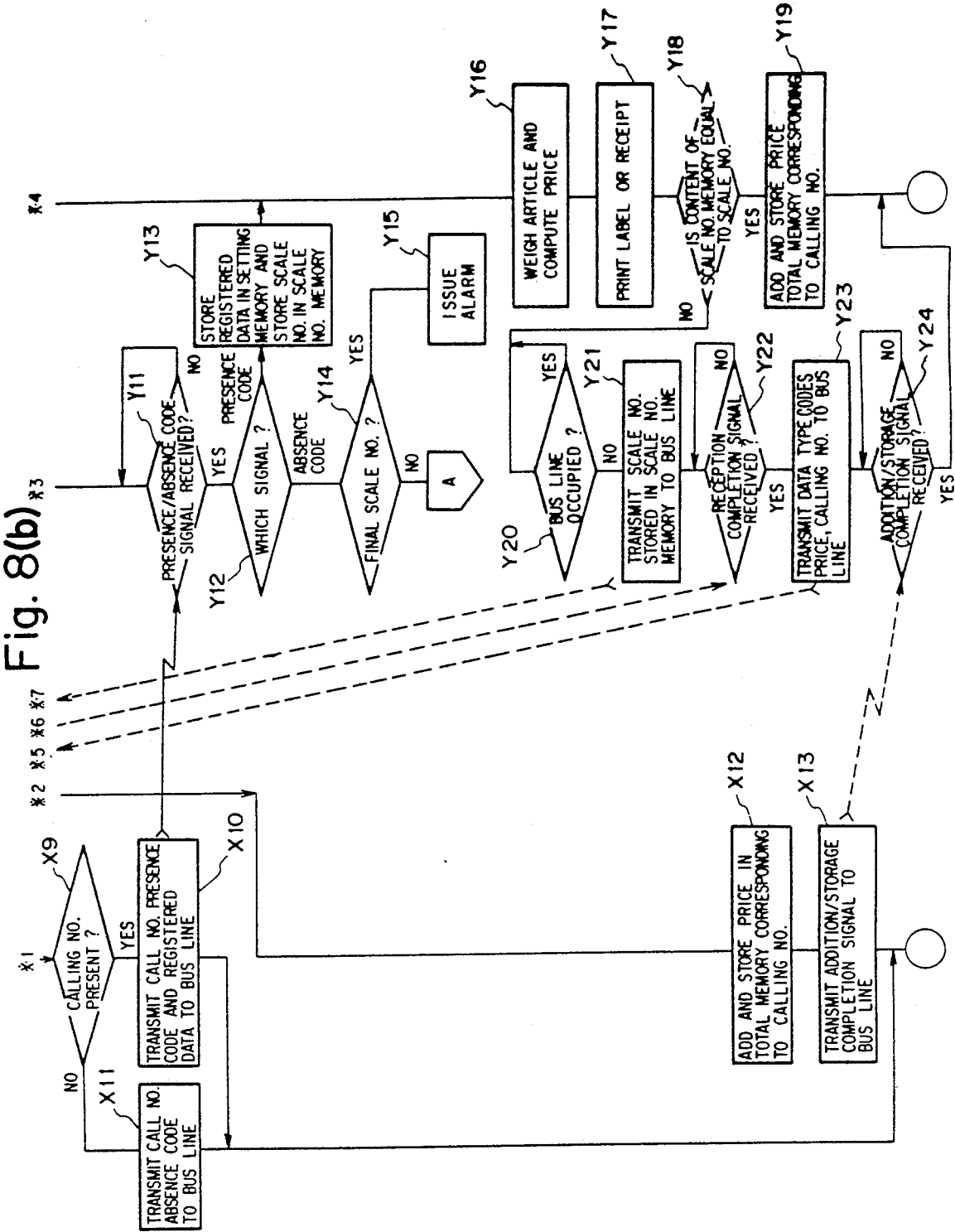

FIG. 8 shows a flowchart of an operation sequence for mutually calling and responding to merchandise or article data items between the electronic scales. It is assumed in the following description of this flowchart that the memory of each of the electronic scales contains various areas such as a register memory and a setting memory, a scale number memory.

(1) When an article is to be weighed by the electronic scale of the scale number 2, the person in charge enters the calling code of the article through the numerical keys 503b and pushes a calling key in the function keys 503c in a step Y1. The electronic scale of the scale number 2 searches the register memory in a step Y2 with the calling number entered through the numeral keys 503b, and checks in a step Y3 to see if the entered calling number is present in the electronic scale.

(2) If the calling number is present in the electronic scale of scale number 2, then the electronic scale transfers the registered data to the setting memory in a step Y9, and stores the scale number 2 in the scale number memory in a step Y10. Then, the electronic scale computes the price of the article in a step Y16 by multiplying the measured weight of the article by the unit price thereof that is stored in the setting memory, and prints a label or receipt in a step Y17. Thereafter, the electronic scale checks the content of the scale number memory in a step Y18. If the content of the scale number memory is the scale number 2, then the electronic scale adds and stores the price in a total memory corresponding to the calling number in a step Y19.

(3) If the calling number of the article is not present in the electronic scale of the scale number 2 in the step Y3, the electronic scale ascertains whether a bus line is occupied in a step Y4. If the answer at step Y4 is ("YES") the system waits. If the bus line is available, then the program goes to a step Y5 in which the electronic scale transmits a minimum scale number (ranging from the scale number 1 up to the scale number n, with the scale number 2 skipped) to the bus line.

A responding electronic scale confirms that there is a scale number signal on the bus line in a step X1, and receives the scale number signal from the bus line in a step X2. If the scale number of the responding electronic scale is not the same as the received scale number in a step X3, then the program jumps to another step. If the scale number of the responding electronic scale is the same as the received scale number in the step X3, then a reception completion signal is transmitted over the bus line in a step X4. If there is no scale number signal on the bus line at the step X1 ("NO"), the system waits until the scale number signal arrives on the bus line. If the scale number signals do not agree at the step X3 ("NO"), then, by way of example, the program returns to a point ahead of step X1 and the system waits until the scale number signal arrives on the bus line.

(4) If the reception completion signal is received by the calling electronic scale in a step Y7, it transmits a data type code (calling number code in this example) and the calling number to the bus line in a step Y8. The responding electronic scale confirms that there is the data type code on the bus line in a step X5, and receives and stores the data type code and the data (calling number) in a step X6. It is determined at the step X5 whether the data type code is on the bus line. If the data type code is not present ("NO"), then the system again returns to a waiting state.

When an unnecessary signal is received on the responding side at the step Y7 ("NO"), the waiting state is entered again.

Then, the responding electronic scale checks which data type code it has received in a step X7. Since the calling number code is recieved in this example, the responding electronic scale searches the register memory thereof with the calling number in a step X8.

(5) If the calling number is not present in the responding electronic scale in a step X9, then the responding electronic scale transmits a calling number absence code to the bus line in a step X11. If the calling number is present in the responding electronic scale in the step X9 ("YES"), then the responding electronic scale transmits a calling number presence code and registered data corresponding to the calling number to the bus line in a step X10. The calling electronic scale checks in a step Y11 to see if it has received a presence/absence code signal. If this presence/absence code signal is received, then the program goes to either a step Y13 when it is the calling number presence code, or a step Y14 when it is the calling number absence code through a step Y12. When a signal is not received from the responding side at the decision made at the step Y11 ("NO"), a state is attained which waits for the signal from the responding side.

(6) The step Y13 stores the registered data transmitted from the responding electronic scale into the setting memory of the calling electronic scale (of the scale number 2), and stores the scale number of the responding electronic scale in the scale number memory. If the calling number absence code is received in the step Y12, the calling electronic scale checks in a step Y14 to see if the scale number is the final scale number. If not (NO), then the program returns to the step Y6 to initiate a processing cycle for the next scale number. If ("YES") the system issues an alarm. If the calling number in question cannot be found even though the processing cycle has proceeded to the final scale number ("YES"), then the calling electronic scale issues an alarm indicating a possible error in a step Y15.

(7) If the content of the scale number memory is not the scale number 2, but the electronic scale in which the calling number is present is the scale number 1 in the step Y18, then the calling electronic scale executes a price totalling routine from a step Y20 and following. The step Y20 ascertains whether the bus line is occupied or not. If the bus lines could not be used ("YES"), the program returns to the input portion of step Y20 and waits until the bus lines can be used. If the bus line is available ("NO"), the scale number stored in the scale number memory is transmitted to the bus line. The responding electronic scale executes the steps X1 through X4 again, and delivers a reception completion signal to the bus line. In response to the reception completion signal in a step Y22, the calling electronic scale transmits a data type code (price code in this example) and the calling number to the bus line in a step Y23. At step Y22, the state is one which awaits the reception completion signal from the responding side. When the reception completion signal does not arrive from the responding side in this waiting state, the program returns to the input portion of the step Y22 and waits for the arrival of the reception completion signal.

The responding electronic scale executes the steps X5, X6. Since the data type code is the price code in the step X7, the responding electronic scale adds and stores the price in a total memory corresponding to the calling number at step X12. Briefly summarized, although the registered data items of the article which is weighed by the electronic scale of the scale number 2 are present in the electronic scale of the scale number 1, signals are exchanged between the electronic scales of the scale numbers 1 and 2 through the common bus line to enable the electronic scale of the scale number 2 to compute the price of the article and issue the price label, and also to enable the electronic scale of the scale number 1 to total the sales of the article.

The calling electronic scale at step Y24 waits for the arrival of the addition/storage completion signal in accordance with step X13 from the electronic scale on the responding side. When this signal does not arrive ("NO"), the program returns to the input side of step Y24 and waits for the arrival of this signal.

Finally, an addition/storage completion signal is transmitted from the responding electronic scale to the bus line in a step X13, and the calling electronic scale receives the addition/storage completion signal in a step Y24. After the addition/storage completion signal is received (Step Y24 "YES"), the series of processing steps is completed.

In the above description, the electronic scale with the scale number 2 calls the electronic scale with the scale number 1. In reality, however, all of paired electronic scales have two calling and responding programs, and can freely call and respond to each other.

A process of changing an article data item will now be described.

(1) A calling code and an article data item to be changed are entered by using the numeral keys 31a and the function keys 31b of the controller 3, and the article data item to be changed is transmitted to the electronic scale which stores the calling code for thereby changing the registered data.

(2) Alternatively, a calling code and article data item to be changed are entered by using the keyboard 12 of the computer 1, and the article data item to be changed is delivered via the controller 3 to the electronic scale which stores the calling code for thereby changing the registered data.

The above examples are effective where the computer 1 and the controller 3 are interconnected by a bus line. However, article data items entered by the computer 1 may be recorded on a cassette tape, and a cassette tape recorder containing the cassette tape may be connected to the controller 3 for storing the article data items recorded on the cassette tape in the buffer memory (RAM) of the controller 3. As an alternative, the function of the controller 3 may be incorporated in the computer 1, and article data items may be registered by connecting the computer 1 to the electronic scales through a bus line.

The function of the controller 3 may be incorporated in a particular electronic scale such as the first electronic scale. In this case, the computer 1 may be directly connected to the particular electronic scale, or article data items entered through the computer 1 may be recorded on a cassette tape, and then delivered from the cassette tape into the buffer memory of the particular electronic scale.

A process of totalling data items such as article prices obtained by the electronic scales will be described below.

Figure 9A:
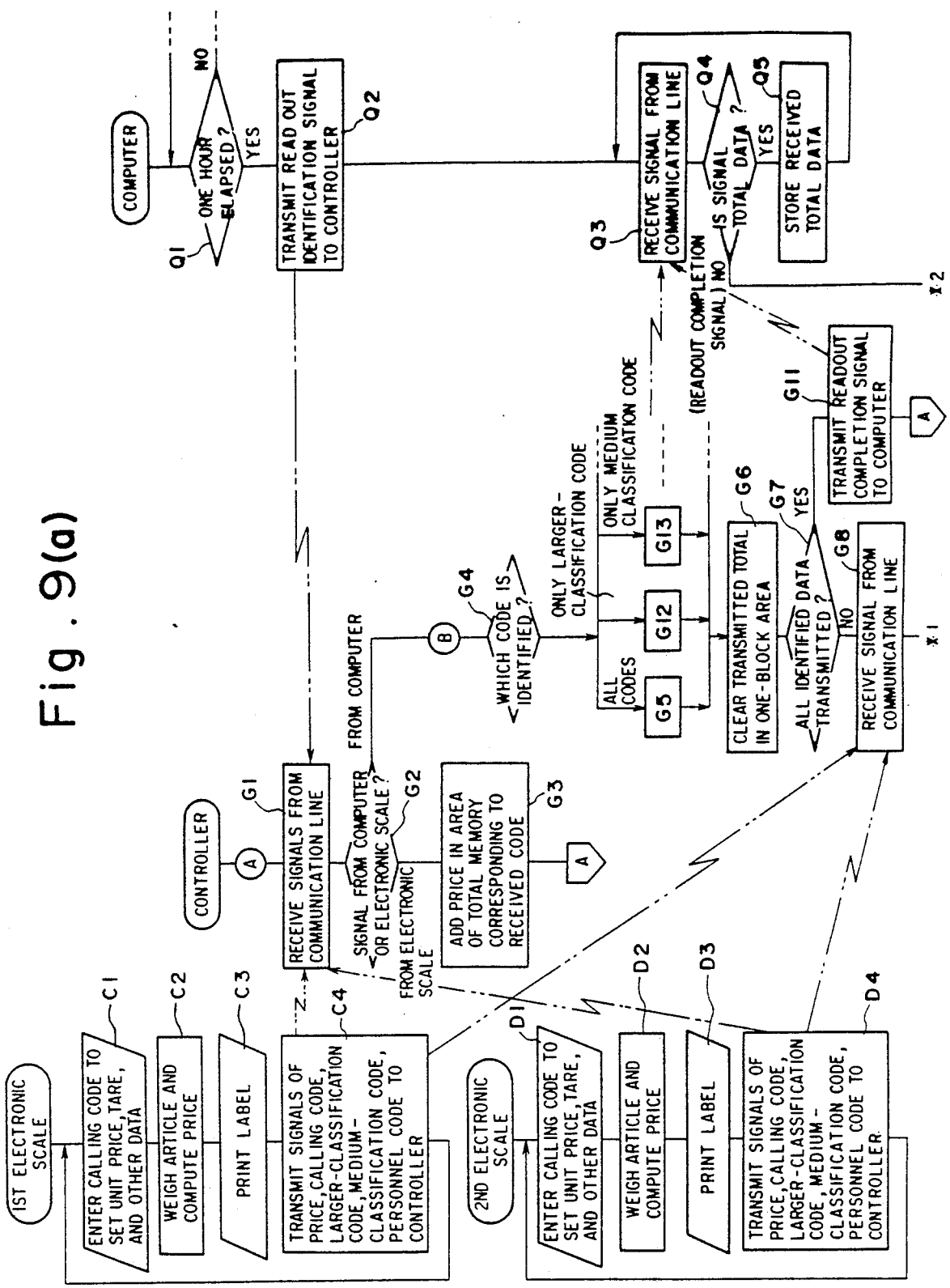
FIG. 9(a) and 9(b), is a flowchart of an operation sequence for totalling data items in the electronic scale system.
Figure 9B:
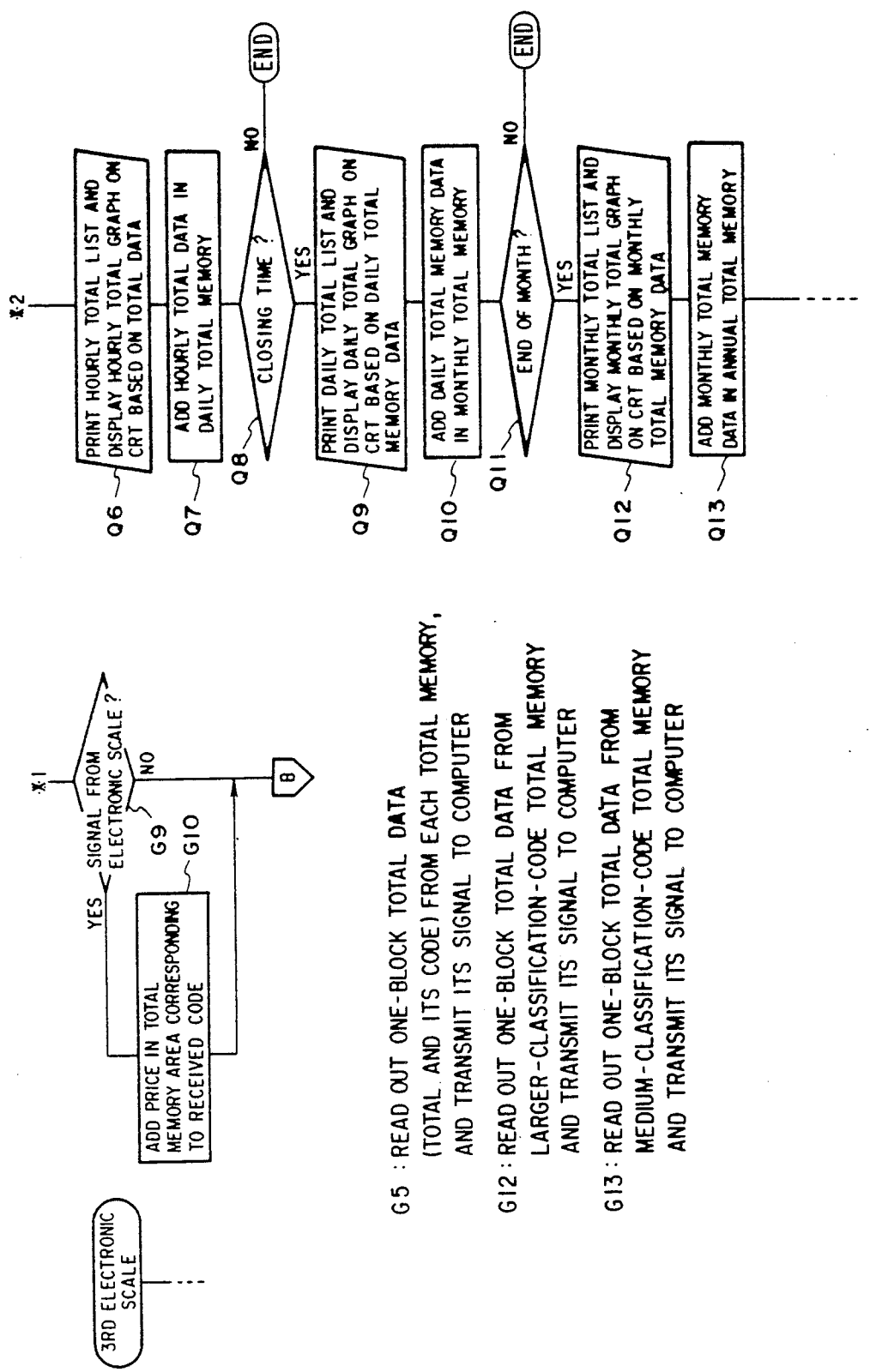

FIG. 9 is a flowchart of an operation sequence for totalling data items in the electronic scale system of the invention.

Various article data items such as article names, unit prices, classification codes, tares, etc. for respective article calling codes are registered in the electronic scales 51, 52, 53, 54, . . . .

[1] Weighing and totalling process:

Each time an article is weighed by an electronic scale, article data items such as a price are transmitted to the controller 3 which totals the article data items. Operation for the second electronic scale 54 to weigh an article will be described below.

(1) First, the second electronic scale enters the calling code of the article to be weighed through the numeral keys to call registered article data items such as a unit price, a tare, a classification code, and the like in a step D1. Then, the second electronic scale weighs the article and computes the price thereof by multiplying its unit price by the weight thereof in a step D2.

(2) The operator pushes his or her own personnel key to print the article name, weight, price, and the like of the article on a label in a step D3. Thereafter, the second electronic scale transmits signals indicative of article data items such as the price, a calling code, a larger-classification code, a medium-classification code, and the like, and the personnel code, which are entered by the operator, into the controller 3 in a step D4.

(3) The controller 3 receives the signals from the communication line 4 in a step G1, and ascertains whether these signals are delivered from the computer 1 or the electronic scale in a step G2. Since the signals have come from the electronic scale, the controller 3 executes a step G3. In the step G3, if the larger-classification code is 200 and the price is 458 yen, 458 yen is added to the total for the larger-classification code 200 in the larger-classification-code total memory, and if the personnel code is 3, 458 yen is added to the total for the personnel code 3 (see FIGS. 4(a), 4(b), 4(c), 4(d)).

The electronic scale system executes the above process from (1) through (3) each time an article is weighed, and the produced data items are totalled in the RAM 504c in the controller 3.

FIG. 9 illustrates a job flow of the first electronic scale 51 at steps C1 through C4. This is for a case where the second electronic scale 52 operates. However, if the first electronic scale 51 performs the operation, the operation, which is similar to (1) and (2), is carried out at steps C1 through C4. A description thereof is omitted to avoid redundancy.

[2] Readout and totalling process:

An example in which a total is read out of the controller 3 for every hour and totalled by the computer 1 will be described below.

(1) The computer 1 executes a step Q1 for each processing cycle or for each time period (such as 1 second). Step Q1 is one type of timer. The computer checks timing every second. If "YES" was obtained in the previous cycle, it is determined whether one hour has elapsed since. If one hour has not elapsed ("NO"), the program returns to the beginning of step Q1 and the check of step Q1 is carried out every second. This operation is repeated. When one hour has elapsed, the program goes from the step Q1 to a step Q2 in which the computer 1 transmits a readout identification signal to the controller 3 for identifying which total is to be read out. For example, the readout identification signal identifies a larger-classification code, a medium-classification code, a calling code, a personnel code, or the like.

(2) The controller 3 receives the readout identification signal in the step G1, confirms that it is from the computer 1 in the step G2, and then checks which total is identified for being read out in a step G4.

If all codes are identified, then the controller 3 reads out total data (totals and their codes) for one block from the respective total memory, and transmits their signals to the computer 1 in a step G5.

If only the larger-classification code is identified, then the controller 3 reads out total data for one block from the larger-classification-code memory and transmits its signal to the computer 1 in a step G12.

If only the medium-classification code is identified, then the controller 3 reads out total data for one block from the medium-classification-code memory and transmits its signal to the computer 1 in a step G13.

Inasmuch as all codes are identified in this example, the controller 3 executes the step G5 to read total data for one block (for example, 256 bytes) from the larger-classification-code total memory, for example, and transmits the total data to the computer 1.

(3) The computer 1 receives the total data in step Q3. The signal received from the communication line is a "signal of total data". Accordingly, the answer at step Q4 is "YES" and the computer 1 stores the received total data at step Q5.

(4) The controller 3 clears the transmitted total in the one-block area to zero in a step G6, and checks to see if all identified data items have been transmitted in a step G7. Since all identified data items have not been transmitted, the program proceeds to a step G8 in which a signal from the communication line is received. Then, a step G9 ascertains whether the signal received by the controller 3 is transmitted from an electronic scale. This decision step is executed since data such as a price may be transmitted from an electronic scale while the total data is transmitted to the computer 1 and the total memory is cleared to zero. If the signal from the electronic scale is received, the program goes from the step G9 to a step G10 in which the price is added in the total memory area corresponding to the received code.

If no signal from an electronic scale is received, the program returns to the step G4.

(5) The process from (2) through (4) above is repeated. The controller 3 transmits total data each time for one block in the step G5. When all total data items are transmitted, the program goes from the step G7 to a step G11 in which a readout completion signal is delivered to the computer 1 in preparation for a next processing cycle.

(6) The computer 1 receives a signal from the communication line in the step Q3, confirms that the signal is not total data in the step Q4 "NO", and then prints an hourly total list based on the stored total data and displays an hourly total graph on the CRT 11 in a step Q6.

Then, the computer 1 adds hourly total data in a daily total memory in the floppy disk 13 for each code in a step Q7, and ascertains whether it is the closing time in a step Q8. If it is not closing time (step Q8 "NO"), the job ends without a display being presented. If the closing time is reached (step Q8 "YES"), then, the computer 1 prints a daily total list on the printer 14, and displays a daily total graph (for example, a bar graph with hourly totals indicated) on the CRT 13 in a step Q9.

Thereafter, the computer 1 retrieves the daily total data from the floppy disk 13 and adds same in a monthly total memory in a step Q10. If it is not the end of the month (step Q11 "NO"), the job ends without carrying out the monthly totalling operation. If the end of a month is reached in a step Q11, then the computer 1 prints a monthly total list on the printer 14 based on the data stored in the monthly total memory, and displays a monthly total graph on the CRT 13 in a step Q12. Then, the computer 1 adds the data of the monthly total memory in an annual total memory in a step Q13

Various modifications can be made to the above-described operation of the electronic scale system as described below.

(1) The total lists can be printed either in order of calling code numbers, or in order of totals, or in order of ratios of totals of articles to the sum total.

(2) Other than the price, the weight of each article or the number of articles can be used as total data.

(3) The total data may be totalled for every 30 minutes, every 2 hours, everyday, or for any desired time interval.

(4) The function of the controller 3 may be incorporated into the computer 1 so that data can be totalled by connecting the computer 1 to the electronic scales.

(5) The function of the controller 3 may be incorporated in a particular electronic scale (for example, the first electronic scale) so that data can be totalled by connecting the computer 1 to the particular electronic scale.

(6) The prices computed for articles weighed by electronic scales may be totalled in the respective electronic scales for each classification code, and the data from the electronic scales can be totalled by connecting the computer 1 to the electronic scales.

The programming language for the computer 1 may be selected from general languages such as BASIC, FORTRAN, COBOL, or the like. Therefore, it is easy to change the program or add a program, and hence the operator can alter the format for lists to be printed, the totalling process, and the like by changing the program.

Figure 10:
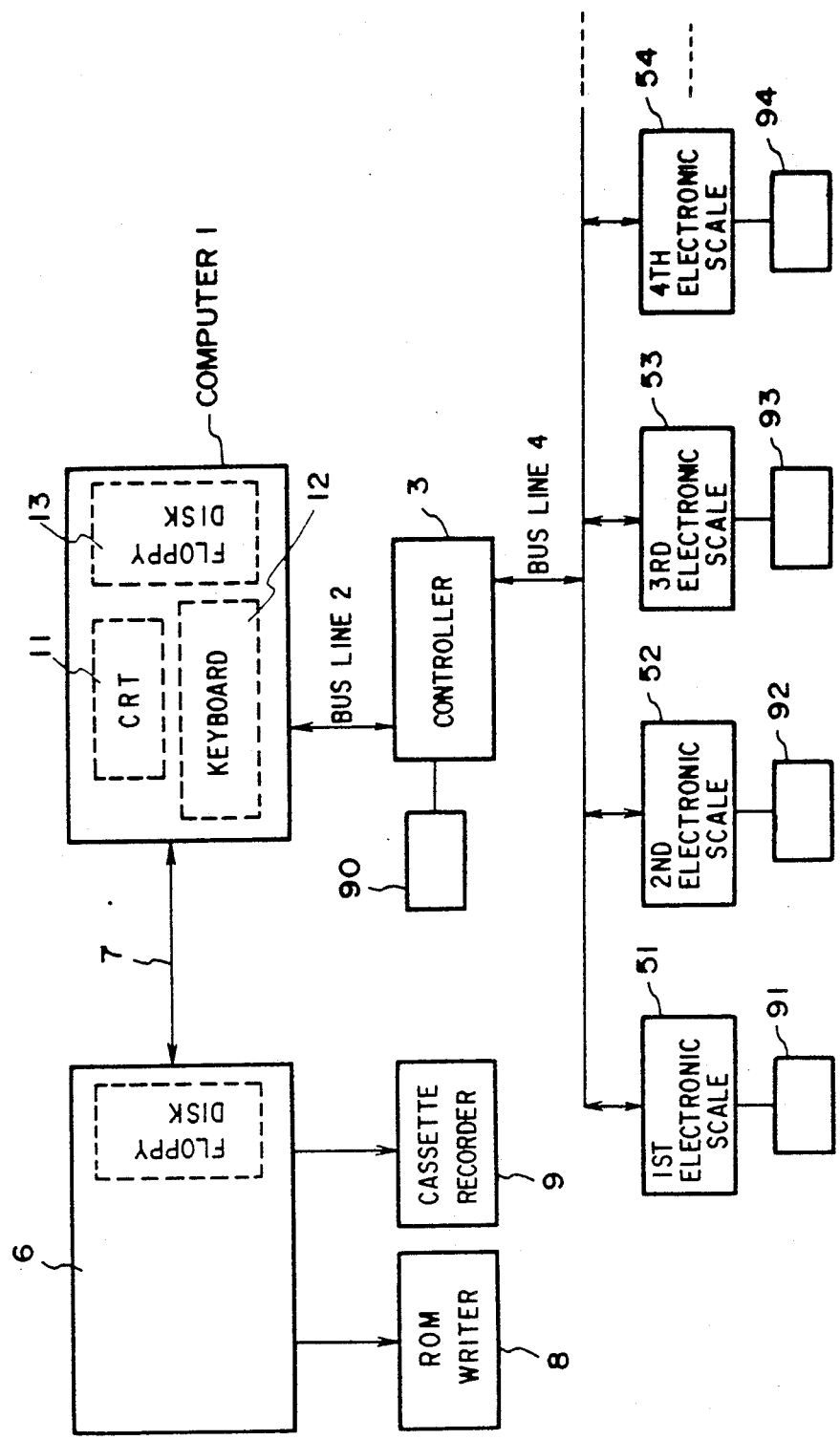
FIG. 10 is a block diagram of an electronic scale system according to another embodiment of the present invention.

FIG. 10 shows in block form an electronic scale system according to another embodiment of the present invention. In this embodiment, the personal computer 1 shown in FIG. 1 is connected to another personal computer 6 through a communication line 7.

As described above, the article data items registered in the RAM 32c of the controller 3 and the RAM 504c of each of the electronic scales 51, 52, 53, 54, ... are backed up by the battery. If, however, the registered data items are destroyed by noise, a voltage drop of the battery, or the like, the article data items would have to be registered again. By storing the registered article data items on a storage medium, however, no subsequent manual keyboard data entry operation is required. As shown in FIG. 10, a ROM writer 8 and a cassette recorder 9 are connected to the computer 6 coupled to the computer 1. The article data items are stored in an external storage medium by the computer 6 through the ROM writer or the cassette recorder 9, and this external storage medium is mounted in cassette recorders 90, 91, 92, 93, 94, ... connected to the controller 3 and the electronic scales for storing the article data items in the controller 3 and the electronic scales.

Figure 11:
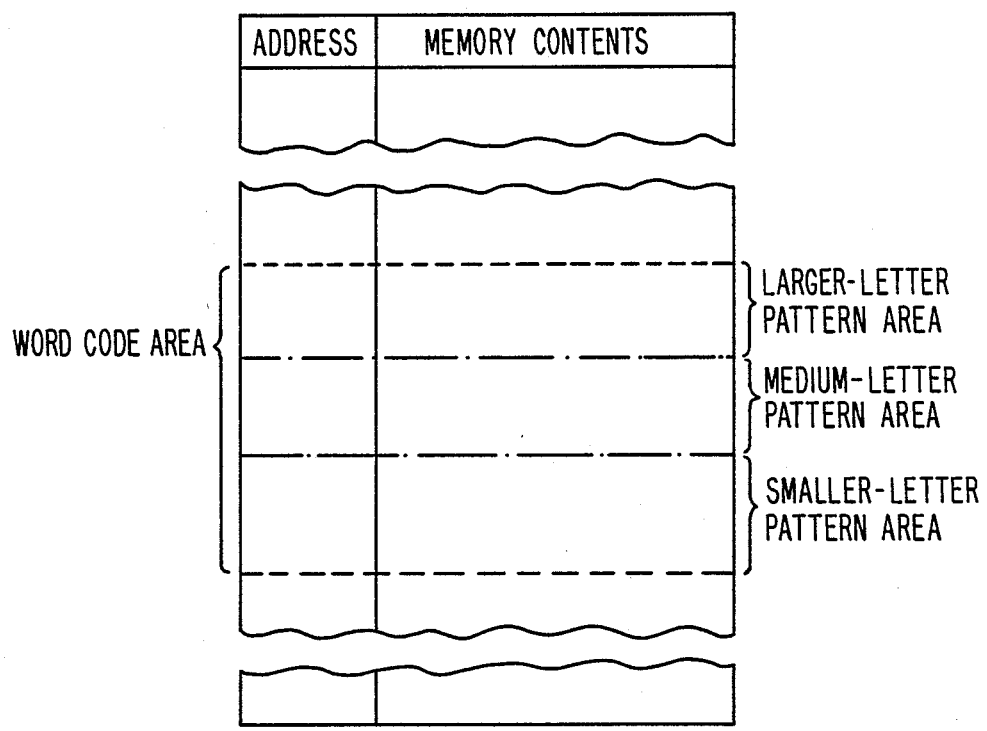
FIG. 11 is a diagram showing the general arrangement of an external storage medium (read-only memory)

The external storage medium, such as a ROM, contains in its word code area a larger-letter pattern area, a medium-letter pattern area, and a smaller-letter pattern area, as shown in FIG. 11. The word code area of the external storage medium includes an address and memory contents as discussed above. Some users use only larger letters, in which case the medium- and smaller-letter pattern areas are useless.

According to the present embodiment, the larger-medium-, and smaller-letter pattern areas are made variable, and when medium and smaller letters are not to be used, such information is manually entered by the operator through the keyboard of the computer 6 when registering article data items, so that the word code area is equalized to the larger-letter pattern area. Thus, the ROM can store a word table in a range including the medium- and smaller-letter pattern areas, and hence can efficiently be utilized.

FIG. 12 is a flowchart of an operation sequence for such automatic storage area adjustment.

(1) Standard letter table data stored in a letter pattern ROM is read out through the ROM writer and is stored in the computer in a step E1. Then, a step E2 ascertains whether larger and medium letters of the letter patterns should be used. If larger and medium letters are used in addition to smaller letters, the flow of FIG. 12 is exited through the "YES" route of step E2. If no, then a step E3 checks to see if larger letters should be cut off. If yes in the step E3, then larger letters stored in the larger-letter pattern area are cut off, and the number of words that can be stored is set in that area to keep a word code area in a step E4. The word code area at this time is increased by the extent equal to the larger-letter pattern area as shown in FIG. 13.

Then, where fixed-data larger letters are designated (for example "THANK YOU"), they are changed to medium letters in a step E5.

(2) If no in the step E3, then the program goes to a step E6 in which the number of storable words is set in the medium-letter pattern area. Where fixed-data medium letters are designated, they are changed to larger letters in a step E7.

In the preceding embodiment, an article data item such as an article name "BEEF" is registered in the register area in the memory of the computer as 8-figure information "12141415", as shown in FIG. 14. Storing article names with numerals corresponding to letters, however, results in many figure positions requiring an increased memory area.

According to still another embodiment of the present invention, after all article names have been registered in a computer, the computer responds to the depression by the operator of a certain key of the keyboard to search for words of higher recurrence. As a result of this search, the computer collects article names of higher recurrence, and arranges them into a word code table such as shown in FIG. 16(e) (the word code for "BEEF" here is "101"). Then, these word codes are registered in the register area in the memory of an electronic scale. Therefore, The register area of the memory can efficiently be utilized since only three figure positions are required for "BEEF" rather than eight figure positions that would otherwise be necessary.

Figure 15A:
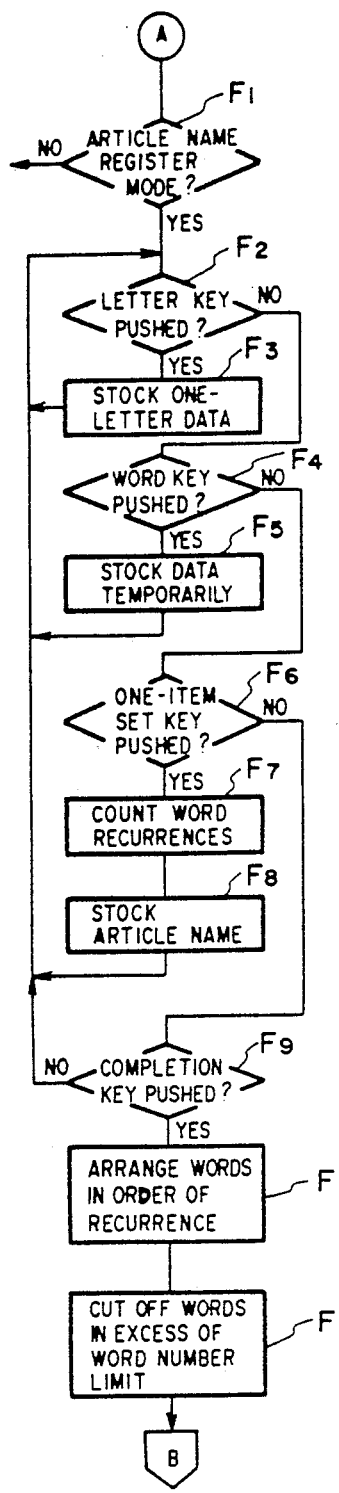
FIGS. 15(a) through 15(c) are flowcharts of operation sequences for automatically coding a word that is higher in registration recurrence.
Figure 15B:
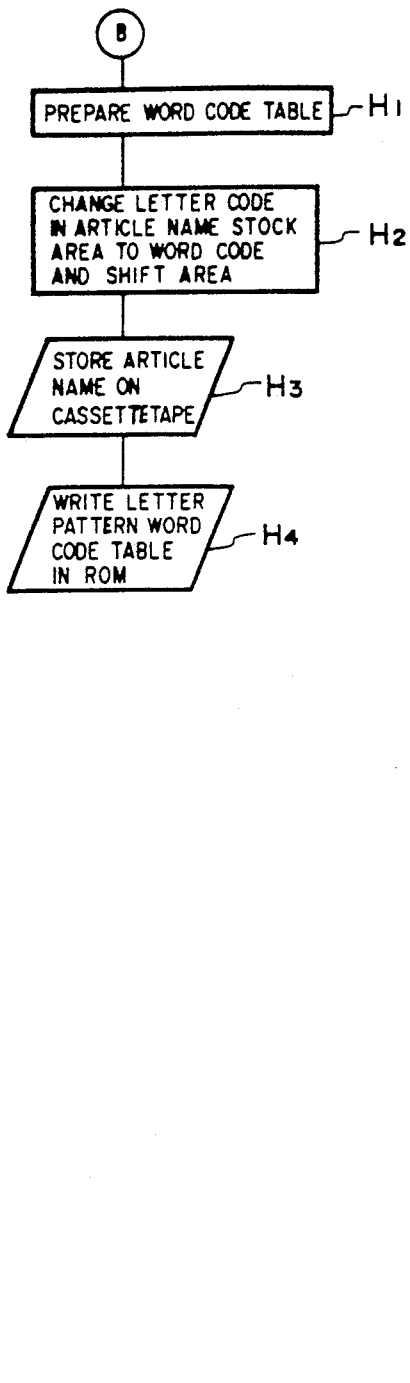
Figure 15C:
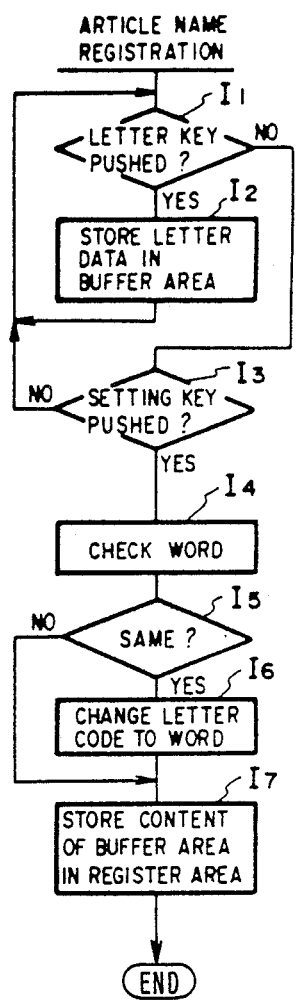

FIGS. 15(a) through 15(c) are flowcharts of operation sequences of automatically coding words of higher recurrence.

I. Searching for words of higher recurrence (FIG. 15(a)):

Various jobs, e.g., such as retrieval of article names, are inputted in an operation sequence shown in FIG. 15(a).

(1) If the inputted job is not registration of an article name at step F1, the job is passed through the "NO" route. It is determined at the step F1 whether the job is the article name registration mode. If the answer is "YES", the program proceeds to a step F2. If a letter key is pushed in a step F2, one-letter data is stocked in a step F3. If the answer to the decision step F2 is no, then a step F4 checks to see if a word key is pushed. If a word key is pushed in the step F4, then data is stocked temporarily in a step F5. The stock area for one article name is arranged as shown in FIG. 16(a). The steps F4, F5 are executed each time one word is entered.

(2) If the answer to the decision step F4 is no, then a step F6 checks to see if a one-item set key is pushed. If pushed, word recurrences are counted in a step F7 to store or stock F8 article names. The article name stock area is arranged as shown in FIG. 16(b). A recurrence count memory stores counts of recurrences of respective article names as shown in FIG. 16(c). The steps F6 through F8 are executed each time one article name is entered.

(3) If the answer to the decision step F6 is no, then a step F9 checks to see if a completion key is pushed. If the answer at step F6 is "NO", step F9 is checked. In other words, the reason for the "NO" at step F6 is confirmed. That is, in a state where the keys for all characters of the article name have not been completely pushed at the step F6 ("NO"), the program returns to the step F2 and the key-in operation 4 is continued. If the state is one in which all characters of the article name have been inputted completely by the key push operation then words are arranged in order of recurrence in a step F10, and words in excess of a word number limit are cutoff in a step F11. For example, the words "ROUND", "BEEF", . . . "STEAK" are arranged in order of recurrence as shown in FIG. 16(d), whereas the word "TIP" is cut off.

II. Coding words (FIG. 15(b)):

First, a word code table composed of three-figure numerals corresponding to respective words is prepared in a step H1 as shown in FIG. 16(e). Then, letter codes in an article name stock area are changed to word codes, and the area is shifted in a step H2. Thereafter, article data items are stored in an external storage medium such as a cassette tape in a step H3. Then, the letter pattern word table is written by the ROM writer into the ROM in a step H4.

III. Article name registration by electronic scale (FIG. 15(c)):

This process is effected by setting the letter table ROM prepared by the process of FIG. 15(b) in an electronic scale, and registering article names through the electronic scale.

Heretofore, where a word code table is stored in advance, a code "101", for example, is entered for "BEEF" by the operator when registering an article name. However, the operator is required to enter such an article name while looking at a reference table of article names and word codes, a task which is tedious and time-consuming to accomplish.

According to this embodiment, the ROM which stores the word code table prepared by the computer as described above is mounted in the electronic scale. When preparing or changing an article name such as "BEEF", the operator enters letters "BEEF" into the electronic scale, whereupon the control unit of the electronic scale searches for a word code corresponding to the entered letters, and converts the letters to a word code "100" for "BEEF", which is stored in the register area of the memory. Therefore, the operator can enter word codes simply by entering corresponding letters without referring to any reference table.

The above process is carried out as follows:

(1) A step I1 checks if letter keys are pushed, and if pushed ("YES"), then letter data is stored in a buffer area in a step I2. If not pushed ("NO"), then a step I3 ascertains whether a setting key is pushed. If the answer at step I3 is ("NO") the program proceeds to step I1. If pushed ("YES"), then the word is checked in a step I4 by ascertaining whether the same word as the word of the stored article name is stored in the word code table in the ROM.

(2) A step I5 checks to see if the same word is located or not, and if yes, then the letter code of the article name stored in the buffer area is changed to the corresponding word in a step I6. If ("NO") the system proceeds to step I7. Then, the content of the buffer area is stored in the register area in a step I7.

FIG. 17 is explanatory of the above process. As shown in FIG. 17, letter keys or a setting key is operated, a letter table ROM is set in an electronic scale, and article names are registered by the electronic scale.

The changing of unit prices will be described below.

In the first embodiment, registered article data items are altered by using the keyboard of the controller 3 or the computer 1 to enter a calling code and an article data item to be altered so that the article data item will be transmitted to the electronic scale in which the entered calling code is stored. However, should the operator be able to alter registered unit prices freely, there would be a possibility of unfair sales practice.

According to this embodiment, the registered unit price of a particular article cannot be altered by the above process only. More specifically, a flag, for example, is established for a registered unit price, and the registered unit price can be altered only by entering a secret No. By letting the market manager or the like know such a secret No., therefore, unfair sales practice resulting from unauthorized alteration of the registered unit price can be prevented.

FIGS. 18(a) and 18(b) are flowcharts of operation sequences for inhibiting such a unit price alteration.

I. Register mode (FIG. 18(a)):

A mode of inhibiting alteration of a unit price is registered in this process. When a flag F/G is "1", the changing of a unit price is inhibited, and when a flag F/G is "0", the changing of a unit price is allowed.

First, the "0" or "1" key of the numeral keys is pushed in a step J1. If the "1" key is pushed in a step J2, the change inhibit flag F/G is set to "1" in a step J3. If the "1" key is not pushed, but the "0" key is pushed in the step J2, the change inhibit flag F/G is set to "0" in a step J4.

II. Normal mode (FIG. 18(b)):

(1) The weight of an article weighed is entered via the A/D converter into the computer in a step K1, followed by checking to see if the weight>0 in a step K2. If the weight>0 and also if the electronic scale is stable in a step K3, then a step K4 ascertains whether registered data has already been read out or not. If yes, then a step K5 ascertains whether the change inhibit flag F/G is "1" or not. If F/G is not "1"("NO"), the flow goes to step K7. If F/G is "1", then the unit price is read out of the register area once again, set, and displayed in a step K6. Therefore, even if the unit price has been read and altered by another operator, it is restored to the original registered unit price, which is stored in the memory.

(2) It is determined at step K7 whether any key has been pushed. If no key has been pushed ("NO"), the program returns to step K1. If a key is pushed in a step K7, a next step K8 checks to see if it is a numeral key. If not, then another process is effected, such as entering a calling number through keys and pushing a calling key to read registered data from the register area. That is, when a key other than the unit price key is pushed, the flow shown in FIG. 18(b) proceeds to another job. If the pushed key is a numeral key, then a step K9 ascertains if the weight>0 or not. If not, i.e., no article is weighed, then key processing is carried out in a step K12 for receiving an input from the numeral keys and storing and displaying entered numerals. If the weight>0 ("YES"), then a step K10 checks to see if article names are searched. If the answer at step K10 is ("NO"), the program proceeds to step K12. If yes, the program goes to a step K11. Step K11 checks to see if F/G=1. If it does not, the program proceeds to a step K12. If it does, the program proceeds to step K1. "1". Consequently, while the weight>0, i.e., an article is being weighed, and if the unit price change inhibit mode is established, i.e., F/G=1, any depression of the numeral keys is neglected. If the answer at the step K2 is "NO", it is decided that the weighing operation is not being carried out. At step K3, the "NO" flow represents a state in which articles have just been placed in the weighing machines, as a result of which the weight values are fluctuating. The "NO" flow at step K4 represents a state in which the operator has placed articles in the weighing machines and the types of these articles have not been keyed in.

When the "NO" answer is received at the steps K2, K3 and K4, the program proceeds to step K7.

FIG. 19 explains a register area for storing registered data. The unit price change inhibit flag "1" or the unit price change permit flag "0" is set for each article item.

Storage of totals in the total memories will be described below.

Totals are obtained for each of the larger-classification codes, the medium-classification codes, and other codes, as described above. These totals are entered through the keyboard for the larger-classification codes, the medium-classification codes, and the like in the RAM 32c of the controller 3 and are stored in the total memories.

These classification codes are the same as article codes. By keeping the classification code total areas with the article name codes, it is not necessary to enter the classification codes for totalling purposes.

According to this embodiment, the types of the larger- and medium-classification codes are automatically searched for based on the registered article name codes by the personal computer 6 connected to the computer 1 (FIG. 10) for keeping the classification total areas.

Figure 20A:
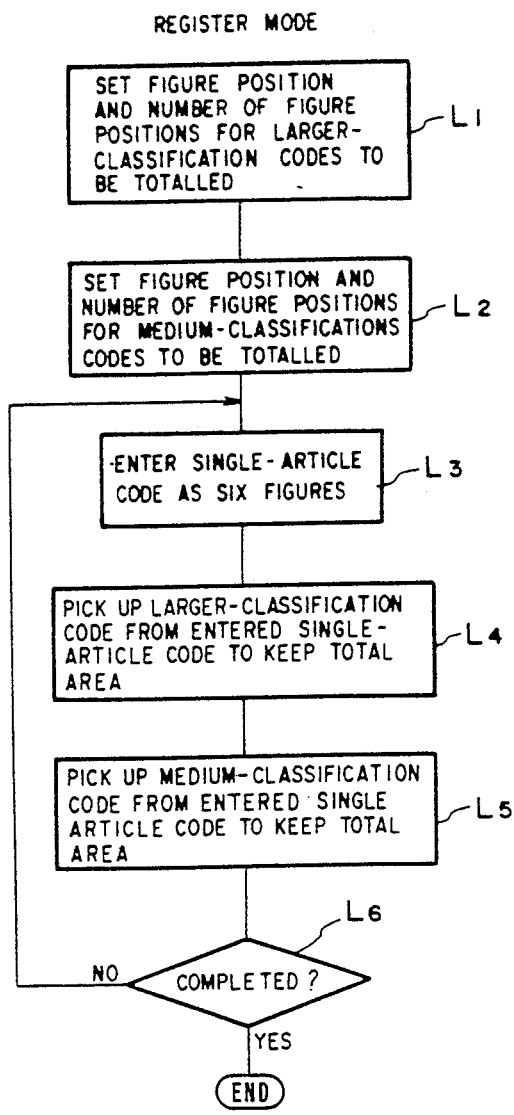
FIGS. 20(a) and 20(b) are flowcharts of operation sequences of a personal computer for registering, classifying, and totalling classification codes by a personal computer.
Figure 20B:
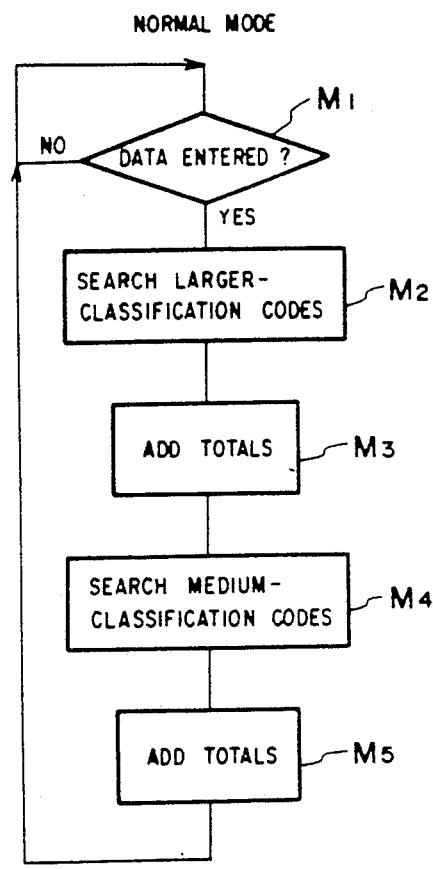

FIGS. 20(a) and 20(b) are flowcharts of operation sequences for registering, classifying, and totalling classification codes with the personal computer.

I. Register mode (FIG. 20(a)):

(1) In a step L1, the figure position and the number of figure positions involved for larger-classification codes to be totalled are established. For example, one figure position from the first figure position is established. Then, the figure position and the number of figure positions involved for medium-classification codes to be totalled are established in a step L2. For example, three figure positions from the first figure position are established.

(2) A single-article code is entered through keys as prescribed figure numbers such as six figures "123456" in a step L3. Then, those figures of the entered single-article code to which the larger-classification code is set are picked up to keep a total area for this classification in a step L4. In this example, the area of the larger classification "1" is kept. Thereafter, those figures of the entered single-article code to which the medium-classification code is set are picked up to keep a total area for this classification in a step L5. In this example, the area of the medium classification "123" is kept. The steps L3 through L5 are repeated until all single-article codes are entered in a step L6. ("NO").When it is determined at the step L6 that the entry of all article codes has ended ("YES"), the program ends.

II. Normal mode (FIG. 20(b)):

This mode is carried out by first ascertaining in a step M1 whether single-article data items such as a single-article code, a weight, a price, and the like have been entered from an electronic scale through the controller. If no, then the program returns to the input side of step M1. If yes, then the larger-classification codes are searched in a step M2, and the totals are added in a step M3. Thereafter, the medium-classification codes are searched in a step M4, and the totals are added in a step M5.

Figure 21:
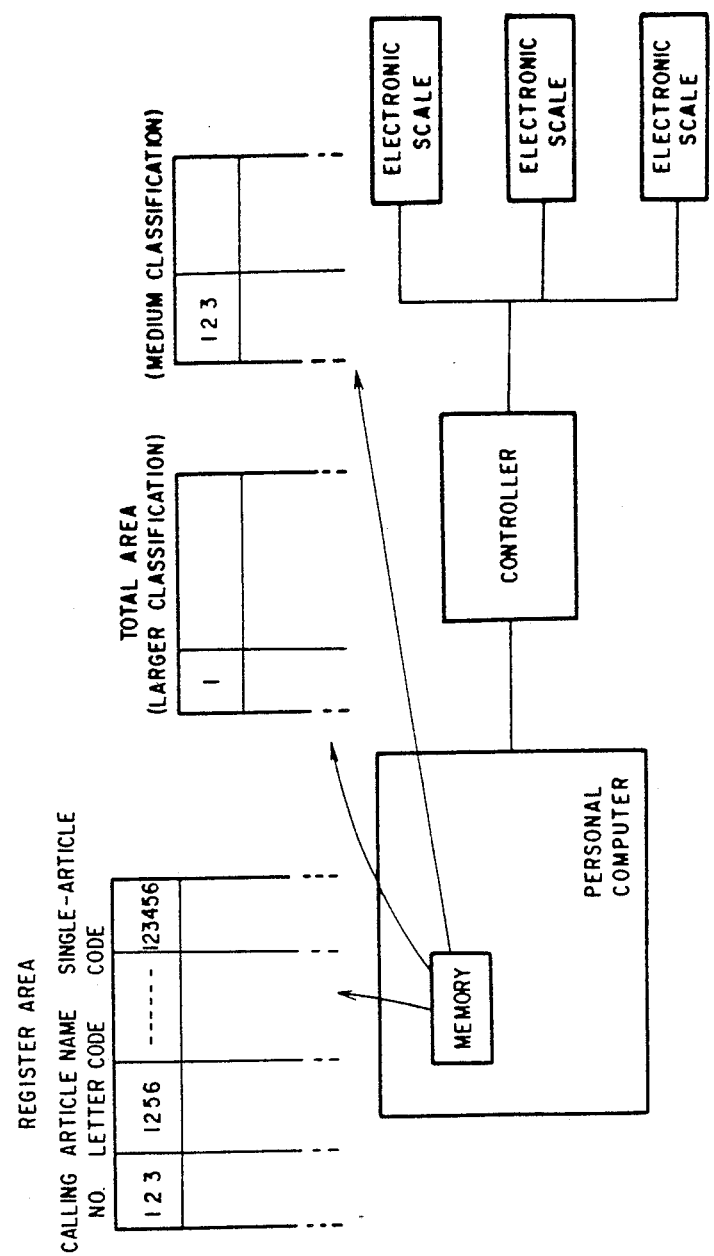
FIG. 21 is a block diagram of an arrangement for registering, classifying, and totalling classification codes by means of the personal computer.

FIG. 21 is a block diagram of an arrangement for registering, classifying, and totalling classification codes by means of a personal computer. As illustrated, the personal computer has a memory for registering and totalling classification codes, the memory including a register area, a larger-classification total area, and a medium-classification total area, each for storing prescribed information.

Transfer of registered data through the use of a plurality of personal computers will be described below. Registered data are prepared by a single personal computer installed in the management office of a supermarket, a dealer, or a computer maker, for example, and are entered on-line or off-line into another personal computer connected to the electronic scales in the supermarket, so that the registered data can be applied to electronic scales and available thereby for effective data utilization. In the system of the present invention, "on-line" means that, under the control of a central processor of a personal computer provided in an office or the like, an electronic scale connected to another personal computer can use the registered data. "Off-line" means that registered data prepared by a personal computer provided in an office or the like are stored on a memory medium such as a floppy disk, after which the contents stored on the memory medium are transferred to another personal computer and can be used by an electronic scale connected to this computer. There are considered three types of such mutual utilization of registered data:

I. Off-line basis:
(a) Use of a cassete tape
(b) Use of a floppy disk
II. On-line basis These three data utilization types will be discussed hereinbelow.

I. (a) Use of a cassette tape on an off-line basis: (FIGS. 22(a), 22(b) and FIGS. 23(a), 23(b))

Figure 22A:
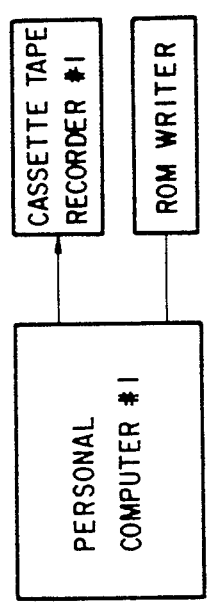
FIGS. 22(a) and 22(b) are block diagrams of arrangements using cassette tapes on an on-line basis.
Figure 22B:
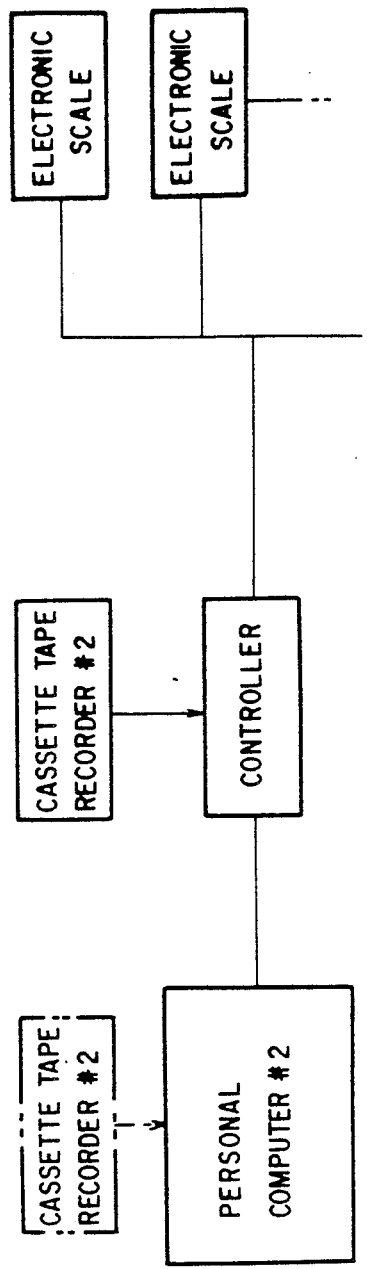

FIGS. 22(a) and 22(b) are explanatory of this data transfer concept. As shown in FIG. 22(a), registered data read out of a ROM writer are stored in a personal computer 1, and this information is transferred to a cassette tape in a cassette tape recorder 1. Then, as shown in FIG. 22(b), a cassette tape recorder 2 is connected to a controller or a personal computer 2, and the cassette tape on which the registered data are recorded by the cassette tape recorder 1 is loaded into the cassette tape recorder 2 to transfer the registered data to each of electronic scales.

Figure 23B:
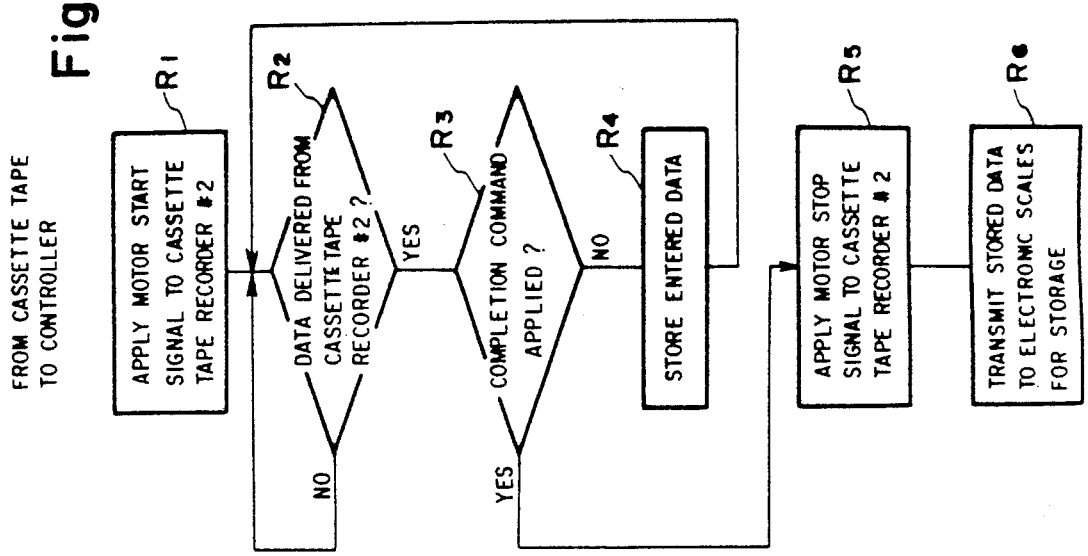
FIGS. 23(a) and 23(b) are flowcharts of operation sequences using cassette tapes on an off-line basis.
Figure 23A:
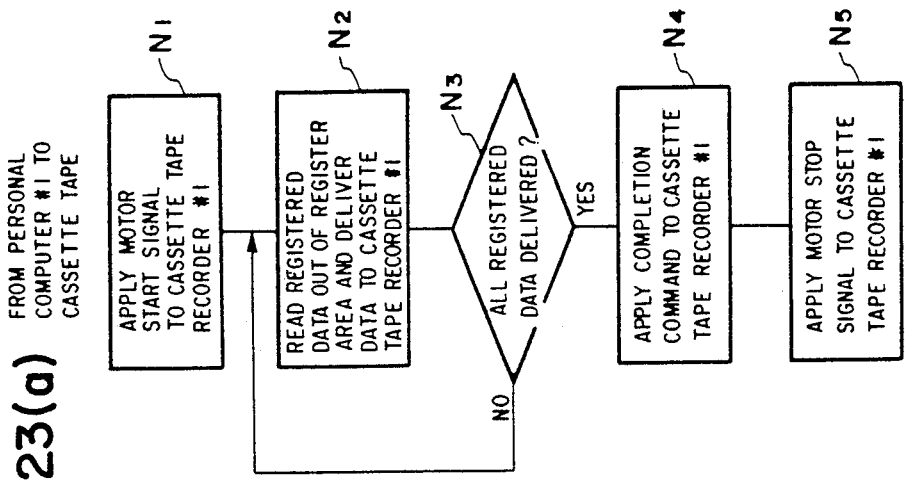

A flowchart of an operation sequence for the above data transfer operation will be described with reference to FIGS. 23(a) and 23(b).

(a) For recording the registered data from the personal computer 1 on the cassette tape:

A motor start signal is applied to the cassette tape recorder 1 in a step N1. The registered data are read out of the register area of the personal computer 1 and delivered to the cassette tape recorder 1 in a step N2. Then, a step N3 checks to see if all of the registered data have been delivered. This check is executed at all times. If all of the registered data have not been read out ("NO") of the register area when this is checked, the program returns to the step N2 and the read-out operation is continued. Then, the read-out operations ends ("YES") and a completion command is delivered to the cassette tape recorder 1 in a step N4, followed by a step N5 in which a motor stop signal is applied to the cassette tape recorder 1.

(b) For transferring the registered data from the cassette tape recorder 2 to the controller or the personal computer 2:

A motor start signal is applied to the cassette tape recorder 2 in a step R1. Then, a step R2 ascertains whether the data are delivered from the cassette tape recorder 2. In the JOB of the computer, ordinarily there is no data input from the tape recorder 2 at the step R2 ("NO"), the program returns to the beginning of step R2 and awaits an input of data. When there is a data input, confirmation is made at step R2 ("YES") and a step R3 ascertains whether a completion command is applied. If no completion command is applied, then the delivered data are stored in a step R4, and the program goes back to the step R2. If a completion command is applied in the step R3, a motor stop signal is applied to the cassette tape recorder 2 in a step R5, and the stored data are successively transmitted to each of electronic scales which store them in a step R6.

I. (b) Use of a floppy disk on an off-line basis: (FIGS. 24(a), 24(b) and FIGS. 25(a), 25(b))

Figure 24A:
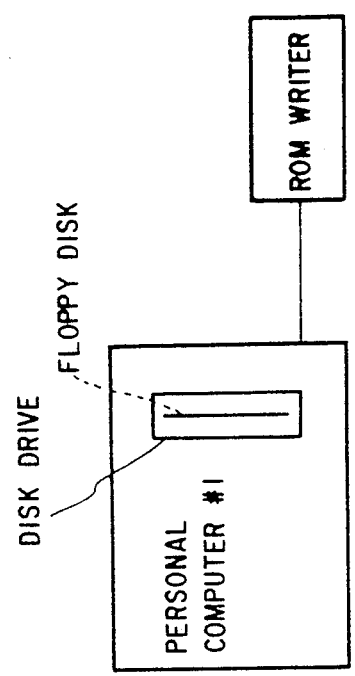
FIGS. 24(a) and 24(b) are block diagrams of arrangements using floppy disks on an on-line basis.
Figure 24B:
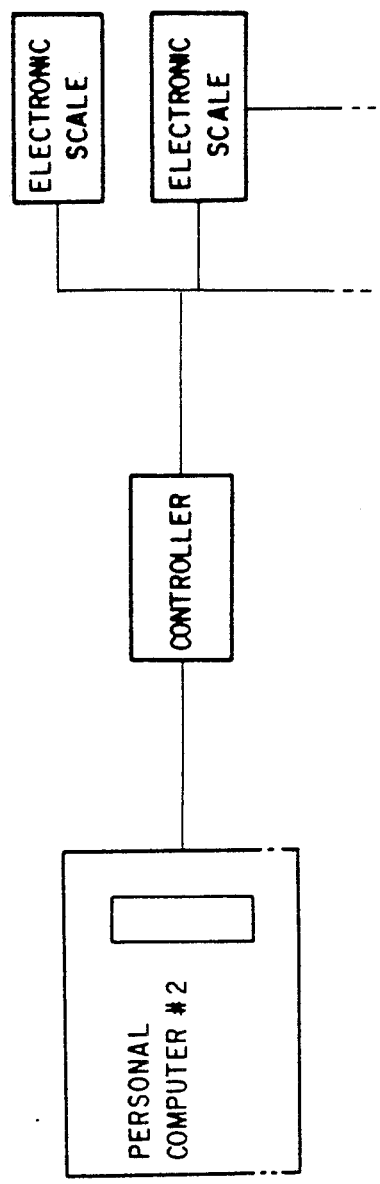

FIGS. 24(a) and 24(b) are explanatory of this data transfer concept. As shown in FIG. 24(a), registered data read out by a ROM writer are stored in a personal computer 1, and this information is recorded on a floppy disk. Then, as shown in FIG. 24(b), the floppy disk is loaded into a personal computer 2 to transfer the registered data to each of electronic scales via a controller.

Figure 25B:
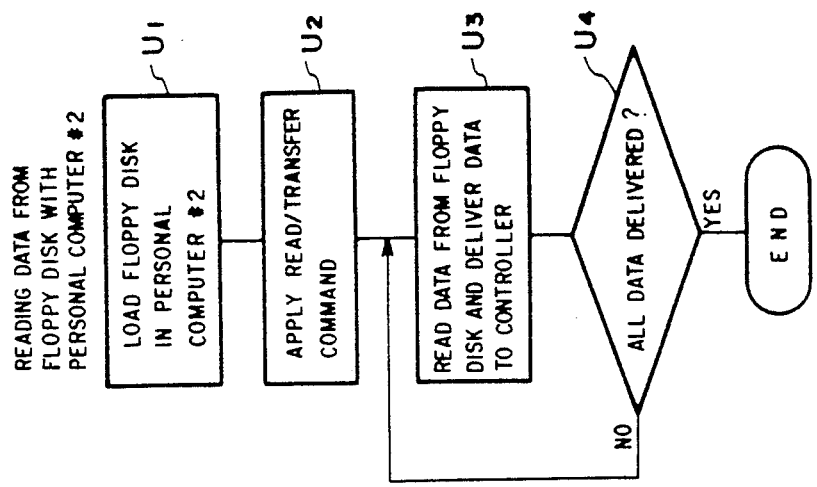
FIGS. 25(a) and 25(b) are flowcharts of operation sequences using floppy disks on an off-line basis.
Figure 25A:
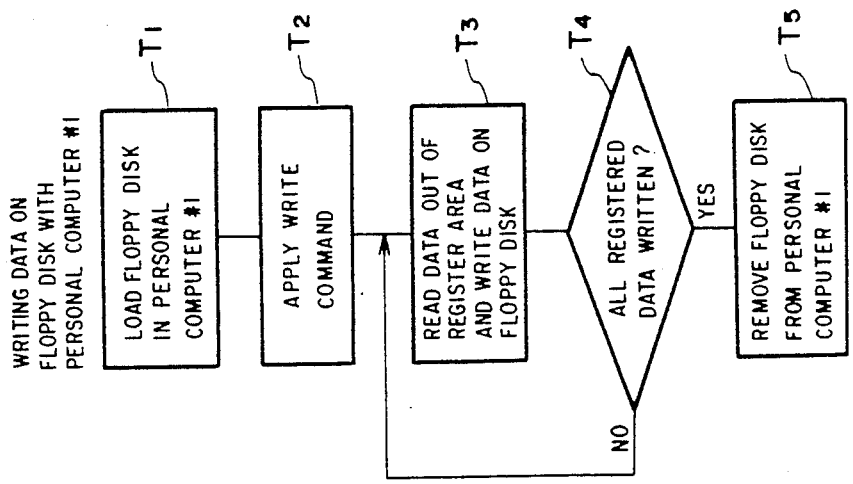

A flowchart of an operation sequence for the above data transfer operation will be described with reference to FIGS. 25(a) and 25(b).

(a) For recording the registered data on a floppy disk loaded in a personal computer 1:

A floppy disk is loaded in a personal computer 1 in a step T1, and a write command for writing the data on the floppy disk is entered through keys in a step T2. Then, the registered data are read out of the register area and written on the floppy disk in a step T3. Whether or not the writing of data into the floppy disk has ended is check at all times at step T4. If the writing of the data has not ended ("NO"), the program returns to the step T3 and the writing of data into the floppy disk is continued. After all of the registered data have been written on the floppy disk in a step T4 ("YES"), the floppy disk is removed from the personal computer 1 in a step T5.

(b) For reading information on the floppy disk with a personal computer 2:

The floppy disk removed from the personal computer 1 is loaded in the personal computer 2 in a step U1, and a read/transfer command is applied through keys in a step U2. Then, the data are read out of the floppy disk and delivered to a controller in a step U3. It is checked at all times at step U4 whether the readout of data stored in the floppy disk has been completed. If readout has not been completed ("NO"), the program returns to the step U3 and readout of the data continues. The process is finished when all of the data are delivered in ("YES") in a step U4.

Figure 26:
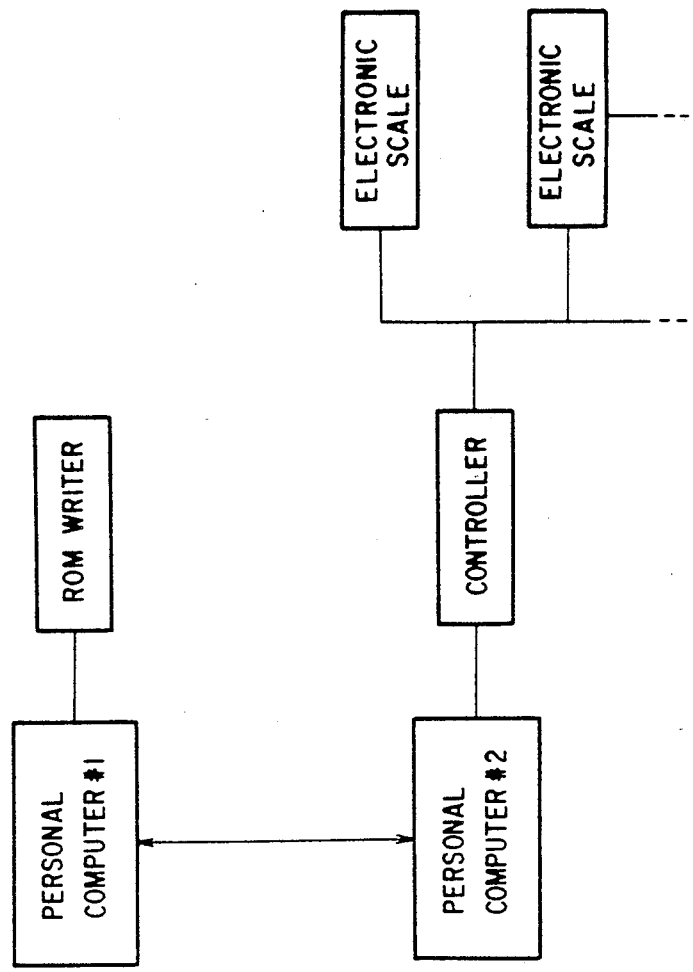
FIG. 26 is a block diagram of an arrangement for transferring registered data on an on-line basis.

II. On-line basis:

FIG. 26 is a block diagram of an arrangement for transferring registered data on an on-line basis. As shown, registered data read out by a ROM writer are stored in a personal computer 1, and thereafter transferred from the personal computer 1 via a communication line to a personal computer 2 so that the data can be utilized by each of the electronic scales.

FIG. 27 is a flowchart of an operation sequence for transferring registered data stored in the personal computer 1 to the personal computer 2.

(1) The personal computer 2 waits for the communication request signal from the personal computer 1 at a step W1. When this signal is found to be absent ("NO"), the program returns to the beginning of step A communication request signal is delivered from the personal computer 1 to the personal computer 2 in a step VI. The personal computer 1 checks for arrival of the communication-possible signal from the personal computer 2 at step V2. If the signal is found to be absent ("NO"), the program returns to the step VI and the communication-possible signal is again sent to the personal computer 2. In response to the communication request signal in a step W1, the personal computer 2 gives the personal computer 1 a communication-possible signal in a step W2. The program thereafter proceeds to step W3, which awaits the registered data from the personal computer 1. If the data is found not to have arrived from the personal computer 1 ("NO"), then the program returns to the beginning of step W3 and the reception mode is established which awaits the arrival of the data. The personal computer 1 checks to see if it has received a communication-possible signal from the personal computer 2 in a step V2.

(2) If the answer to the decision step V2 is yes, then the registered are read out of the register data of the personal computer 1 and delivered to the personal computer 2 in a step V3. The personal computer 2 confirms that the data have been received in a step W3, and then checks to see if the received data are the registered data or not in a step W4. If not, i.e., if a completion command is received, the received data are delivered to a controller in a step W6. If yes, the received data are stored in the personal computer 2 in a step W5. The personal computer 1 ascertains whether all of the registered data have been delivered in a step V4 or not. If yes, the personal computer 1 applies a completion command to the personal computer 2 in a step V5. In the step W6, the controller transmits the registered data which have been transmitted from the personal computer 1, stored in the personal computer 2, and transmitted therefrom, successively to the electronic scales.

Although certain preferred embodiments have been shown and described, it should be understood that many changes and modifications may be made therein without departing from the scope of the appended claims.

What we claim is:

1. An electronic scale system, comprising:
   input means for entering merchandise data;
   memory means for storing the merchandise data entered by said input means;
   transmitter means for transmitting the merchandise data stored in said memory means; and
   a plurality of electronic scales each connected to said transmitter means and each having a register memory for storing the merchandise data transmitted from said transmitter means and means for storing the merchandise data in an unregistered area of said register memory for each merchandise item.

2. An electronic scale system according to claim 1, wherein one of said electronic scales includes means for transmitting the merchandise data stored in said register memory successively to the electronic scales.

3. An electronic scale system, comprising:
   a computer having input means for entering merchandise data and computer memory means for storing the merchandise data entered by said input means;
   a controller, connected to said computer, having controller memory means for receiving and storing the merchandise data stored in the computer memory means, and transmitter means for transmitting the merchandise data stored in said controller memory means; and
   a plurality of electronic scales, connected to said transmitter means, each having a register memory for storing the merchandise data transmitted from said controller and means for storing the merchandise data in an unregistered area of said register memory for each merchandise item.

4. An electronic scale system according to claim 3, further comprising a communication line, and said computer and said controller are connected by said communication line.

5. An electronic scale system according to claim 3, further comprising a printer and said computer is connected to said printer.

6. An electronic scale system, comprising:
   a plurality of electronic scales each having a register memory for storing article merchandise data including unit prices and classification codes, weighing means for weighing articles of merchandise, and arithmetic means for computing the price of an article weighed based on the weight and unit price thereof;
   memory means for storing totals and storing data items including prices obtained from said electronic scales according to the classification codes; and
   means for reading, totalling, and storing the totalled data from said memory means for a prescribed period of time.

7. An electronic scale system according to claim 6, wherein said reading, totalling, and storing means comprises a totalling memory.

8. An electronic scale system according to claim 6, wherein one of said electronic scales includes said means for totalling and storing data items including prices obtained from the respective electronic scales, according to the classification codes.

9. An electronic scale system, comprising:
   a plurality of electronic scales each having a register memory for storing article merchandise data including unit prices and classification codes, weighing means for weighing articles of merchandise, and arithmetic means for computing the price of an article weighed based on the weight and unit price thereof;
   a communication line;
   a controller connected to said electronic scales through said communication line and having memory means for storing totals and storing data items including prices obtained from said electronic scales according to the classification codes; and
   a computer connected to said controller through said communication line and having means for reading, totalling, and storing the totalled data from said memory means for a prescribed period of time.

10. An electronic scale system according to claim 9, wherein said reading, totalling, and storing means comprises a totalling memory.

11. An electronic scale system according to claim 9, further comprising a printer and said computer is connected to said printer.

12. An electronic scale system, comprising:
a plurality of electronic scales;
a transmission line connected to said electronic scales;
a first computer having input means, connected to said electronic scales through said transmission line, and for entering merchandise data and having means for transferring the merchandise data entered by said input means to said electronic scales;
a second computer connected to said first computer and having means for preparing merchandise data to be entered into said first computer; and
memory means for storing the merchandise data prepared by said second computer and to be entered into said first computer.

13. An electronic scale system according to claim 12, wherein the merchandise data prepared by said second computer and to be entered into said first computer is transferred from said second computer to said first computer on an on-line basis.

14. An electronic scale system according to claim 12, wherein said memory means comprises a variable letter pattern area of a word code area for articles of merchandise.

15. An electronic scale system according to claim 12, wherein said second computer includes means for searching article names in the merchandise data stored in said memory means for words of higher recurrence and preparing a word code table.

16. An electronic scale system according to claim 12, wherein said second computer includes means for preparing data to inhibit alteration of unit prices in the merchandise data stored in said memory means.

17. An electronic scale system according to claim 12, wherein said first computer includes means for preparing data to inhibit alteration of unit prices in the merchandise data stored in said memory means.

18. An electronic scale system according to claim 12, wherein each of said electronic scales includes means for issuing a command to inhibit alteration of unit prices in the merchandise data.

19. An electronic scale system according to claim 12, wherein each of said electronic scales includes means for arranging and registering registered data with classification codes of the merchandise data stored in said memory means, and means for totalling and adding the registered data with the classification codes.

20. An electronic scale system according to claim 12, further including a third computer, and transfer means for transferring registered data prepared by said third computer to said second computer so that said electronic scales can utilize the registered data via a controller.

21. An electronic scale system according to claim 12, further comprising a storage medium, and the merchandise data prepared by said second computer and to be entered into said first computer are stored on said storage medium, and are transferred between said first and second computers on an off-line basis.

22. An electronic scale system according to claim 21, wherein said storage medium comprises a cassette tape.

23. An electronic scale system according to claim 21, wherein said storage medium comprises a floppy disk.

* * * * *

UNITED STATES PATENT AND TRADEMARK OFFICE
CERTIFICATE OF CORRECTION

PATENT NO. : 4,901,237

DATED : February 13, 1990

INVENTOR(S) : Michiyasu Hikita et al.

It is certified that error appears in the above-identified patent and that said Letters Patent is hereby corrected as shown below:

Col. 1, line 45, "articles" s/b --article--;
line 54, after "article" s/b --item--.

Col. 2, line 45, "at each of" s/b --at the end of--.

Col. 8, line 51, "and a" s/b --, a--;
line 52, ", a" s/b --and--.

Col. 21, line 7, "step" s/b --step W1.--;
line 28, after "registered" s/b --data--, delete "data" (2nd occurrence).

Signed and Sealed this

Seventeenth Day of September, 1991

*Attest:*

HARRY F. MANBECK, JR.

*Attesting Officer*   *Commissioner of Patents and Trademarks*